United States Patent
Obayashi et al.

[11] Patent Number: 6,048,924
[45] Date of Patent: Apr. 11, 2000

[54] AQUEOUS RESIN COMPOSITION AND AQUEOUS PAINT

[75] Inventors: Ryoichi Obayashi, Osakasayama; Takeshi Yamashita, Sanda; Shuichi Koshizawa, Kawaguchi; Masanori Iwahashi, Izumiotsu; Taiji Sato, Yokohama; Kiyoshi Onishi, Sakai; Masaharu Takahashi, Osaka, all of Japan

[73] Assignee: Dainippon Ink and Chemicals, Inc., Tokyo, Japan

[21] Appl. No.: 09/068,341

[22] PCT Filed: Sep. 10, 1997

[86] PCT No.: PCT/JP97/03182

§ 371 Date: May 11, 1998

§ 102(e) Date: May 11, 1998

[87] PCT Pub. No.: WO98/11165

PCT Pub. Date: Apr. 19, 1998

[30] Foreign Application Priority Data

Sep. 10, 1996 [JP] Japan .................... 8-239109
Sep. 11, 1996 [JP] Japan .................... 8-240402

[51] Int. Cl.[7] .................... C08J 3/02; C08K 3/20; C08L 3/20
[52] U.S. Cl. .................... 524/501; 524/538; 524/539; 524/542; 524/843
[58] Field of Search .................... 524/501, 538, 524/539, 542, 555, 831, 843, 850

[56] References Cited

U.S. PATENT DOCUMENTS 5,455,306 10/1995 Mori et al. .
5,516,834 5/1996 Mori et al. .

FOREIGN PATENT DOCUMENTS 44 07 236 A1  9/1994  Germany .
9-208821      8/1987  Japan .
6256708       9/1994  Japan .
8-176249      7/1996  Japan .
9-143169      6/1997  Japan .
2 276 389A    9/1994  United Kingdom .
276389        9/1994  United Kingdom .

*Primary Examiner*—Robert Dawson
*Assistant Examiner*—D. Aylward
*Attorney, Agent, or Firm*—Armstrong, Westerman, Hattori, McLeland and Naughton

[57] ABSTRACT

The subject of the present invention is to provide a water-borne resin composition having excellent hydrophilicity, that is, water reducibility or water dispersibility, can decrease the amount of organic solvent contained in a coating, has excellent curability, water resistance, flexibility, heat resistance, hardness which are equivalent to those of solvent-borne amino resin, and which can decrease discharges in a dryer, and a water-borne coating comprised thereof. The above problem can be solved by a water-borne resin composition comprising:

amino resin (A) obtained from amino compound (a) comprising at least one carboxyl group in a phenyl group of benzoguanamine, the amino compound (a) represented by chemical formula 1 and water-borne resin (B) having a functional group reactive with the amino resin (A), and water-borne coating comprising the water-borne resin composition as an essential component.

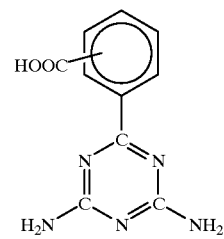

17 Claims, No Drawings

AQUEOUS RESIN COMPOSITION AND AQUEOUS PAINT

BACKGROUND OF THE INVENTION

The present invention relates to a water-borne resin composition comprised of amino resin (A) obtained from amino compound (a) comprising at least one carboxyl group in a phenyl group of benzoguanamine and water-borne resin (B) having a functional group reactive with the amino resin (A), which has excellent water reducibility, or water dispersibility, and excellent water resistance, solvent resistance, a retort resistance, and curability which are useful properties as a binder or an additive for coatings, processed paper goods, processed fiber goods, adhesives, inks, and other coatings, and a water-borne coating comprised thereof as an essential component.

BACKGROUND ART

Primarily from an environmental conservation point of view, it has, for example, long been desired to decrease organic solvents released from coatings in coating processes. Therefore, demand for non-environmentally polluting resin, that is, water-borne resin, has rapidly increased. As a cross-linking agent used in a water-borne coating, a water soluble coating, methylated amino resin is the most popular. However, methylated amino resin is hydrophobic. Therefore, methylated amino resin does not have very good water resistance, solvent resistance, curability and the like compared to the properties of solvent-borne amino resin. In addition, solubility in water of methylated amino resin is insufficient; therefore, it is difficult to decrease the amount of organic solvent contained in a coating. Moreover, amino resin having low molecular weight is released in a dryer, the released material is deposited as discharges, and then contaminates coated goods. Therefore, it is difficult to obtain a water-borne resin composition having adequate properties.

A measure of dissolving of a water insoluble alkyletherificated amino resin, for example, includes measurements in which oxycarbonic acid is used as disclosed in U.S. Pat. Nos. 3,464,946, 3,444,114, etc.

However, when this kind of cross-linking agent is used, water resistance, flexibility, curability, and the like are inadequate, therefore, it is impossible to obtain a coating producing an excellent cured film, that is, to obtain a coating having adequate properties. In particular, when these water-borne resin compositions are used as a binder for coatings or inks and the like, heat resistance is inferior.

Therefore, the problem to be solved in the present invention is to provide a water-borne resin composition which has excellent hydrophilicity (including water reducibility), that is, water reducibility or water dispersibility, can decrease the amount of organic solvent contained in a coating, has excellent curability, water resistance, flexibility, heat resistance, hardness which are equivalent to those of solvent-borne amino resin, and which can decrease discharges in a dryer, and a water-borne coating comprised thereof.

DISCLOSURE OF THE INVENTION

As the result of extensive investigations directed to solving the problems described above, the present inventors found that a water-borne resin composition comprising amino resin (A) obtained from amino compound (a) comprising at least one carboxyl group in a phenyl group of benzoguanamine and water-borne resin (B) having a functional group reactive with the amino resin (A) can produce a desired water soluble material or water dispersed material, and thereby reached the present invention.

That is, the present invention relates to (1) a water-borne resin composition comprising:
amino resin (A) obtained from amino compound (a) comprising at least one carboxyl group in a phenyl group of benzoguanamine, the amino compound (a) is represented by chemical formula 1 and water-borne resin (B) having a functional group reactive with the amino resin (A);

(chemical formula 1)

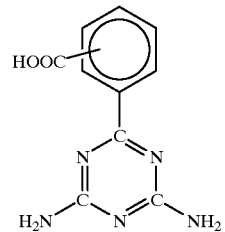

(2) a water-borne resin composition according to (1), wherein amino resin (A) is obtained by addition reaction of aldehyde compound (b) to amino compound (a), and by etherificating with monohydric alcohol compound (c);

(3) a water-borne resin composition according to (1), wherein amino resin (A) is obtained from amino compound (a) and at least one compound selected from the group consisting of urea, melamine, benzoguanamine, cyclohexanecarboguanamine, steroguanamine, acetoguanamine, phthaloguanamine, and spiroguanamine;

(4) a water-borne resin composition according to (I), wherein amino resin (A) is obtained by addition reaction of aldehyde compound (b) to amino compound (a), at least one compound selected from the group consisting of urea, melamine, benzoguanamine, cyclohexanecarboguanamine, steroguanamine, acetoguanamine, phthaloguanamine, and spiroguanamine, and etherificating with monohydric alcohol compound (c);

(5) a water-borne resin composition according to any one of (1) to (4), wherein water-borne resin composition comprises 10 to 80 weight parts of amino resin (A) and 20 to 90 weight parts of water-borne resin (B);

(6) a water-borne resin composition according to any one of (1) to (5), wherein water-borne resin (B) having a functional group reactive with the amino resin (A), comprises an activated hydrogen group;

(7) a water-borne resin composition according to (6), wherein water-borne resin (B) comprises a hydroxyl group and a carboxyl group;

(8) a water-borne resin composition according to (6), wherein water-borne resin (13) comprises a N-alkoxyalkyl substituted amide group and a carboxyl group;

(9) a water-borne resin composition according to (6), wherein water-borne resin (B) is water dispersed resin obtained by emulsion polymerization;

(10) a water-borne resin composition according to (9), wherein water-borne resin (E) is obtained by emulsion polymerization of unsaturated monomers comprising unsaturated monomer having a functional group which can react with amino resin (A);

(11) a water-borne resin composition according to (10), wherein unsaturated monomer having a functional group which can react with amino resin (A) comprises at least one family selected from the group consisting of N-alkoxyalkyl substituted amide group, N-alkoxyalkyl group, N-methylol group, carboxyl group, and hydroxyl group; and

(12) a water-borne coating comprising a water-borne resin composition according to any one of (1) to (11) as an essential component.

PREFERRED EMBODIMENT TO PRACTICE THE PRESENT INVENTION

The components of the present invention will be explained below.

Amino compound (a) comprising at least one carboxyl group in a phenyl group of benzoguanamine of the present invention, which is represented by chemical formula 1 is (chemical formula 1)

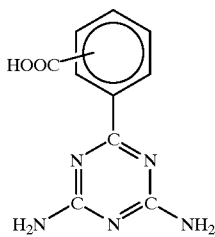

For example, the compound comprising at least one carboxyl group in a phenyl group of benzoguanamine includes 2-, 3- or 4-(4,6-diamino-1,3,5-triazine-2-yl)-benzoic acid.

From the point of view of ease of separation in synthesizing, among these compounds, 2-(4,6-diamino-1,3, 5-triazine-2-yl)-benzoic acid is used easily.

Amino resin (A) used in the present invention which is obtained from amino compound (a) which comprises at least one carboxyl group in a phenyl group of benzoguanamine and is represented by chemical formula 1, includes amino resin obtained from amino compound (a) and at least one compound selected from the group consisting of urea, melamine, benzoguanamine, cyclohexanecarboguanamine, steroguanamine, acetoguanamine, phthaloguanamine, and spiroguanamine, besides amino resin obtained by addition reaction of aldehyde compound (b) to amino compound (a), and then by etherificating with monohydric alcohol compound (c).

More specifically, amino resin (A) is obtained by addition reaction of aldehyde compound (b) to amino compound (a), at least one compound selected from the group consisting of urea, melamine, benzoguanamine, cyclohexanecarboguanamine, steroguanamine, acetoguanamine, phthaloguanamine, and spiroguanamine, and etherificating with monohydric alcohol compound (c). Certainly, amino resin (A) used in the present invention can be prepared by mixing amino resin obtained by using the aforementioned amino compound (a) and well-known and conventional amino resins.

Aldehyde compound (b) used in producing amino resin (A) of the present invention may be well-known and conventional aldehyde compounds used in producing amino resin. There are no particular limitations placed on the formaldehyde, paraformaldehyde, acetaldehyde, propionaldehyde, butylaldehyde, and glyoxal, employed. From points of view of cost and reactivity, formaldehyde, paraformaldehyde, and glyoxal are preferably used. These compounds may be used alone, or in combinations of two or more.

Monohydric alcohol compound (c) used in producing amino resin (A) of the present invention may be well-known and conventional alcohol compounds used in producing amino resin. There are no particular limitations placed on methyl alcohol, ethyl alcohol, n-propyl alcohol, iso-propyl alcohol, n-butyl alcohol, isobutyl alcohol, sec-butanol, tert-butyl alcohol, n-amyl alcohol, n-octyl alcohol, 2-ethylhexyl alcohol, lauryl alcohol, ethylene glycol monomethyl ether, ethylene glycol monoethyl ether, amouethylene glycol monobutyl ether, aryl alcohol and the like employed as representative compounds. These monohydric alcohols may be used alone, or in combinations of two or more. From the points of view of reaction properties, cost, and cross-linking properties of the obtained amino resin, methyl alcohol, n-butyl alcohol, isobutyl alcohol, and isopropyl alcohol are in particular preferably used, among these monohydric alcohols.

In order to prepare amino resin (A) of the present invention, the well-known and conventional manufacturing methods can be applied. For example, amino resin (A) of the present invention can be prepared by adding 1.5 to 8.0 mol of aldehyde compound (b) and 4.0 to 20.0 mol of monohydric alcohol (c) to 1.0 mol of compounds having amino group comprising amino compounds (a) which comprise at least one carboxyl group in a phenyl group of benzoguanamine, and is represented by chemical formula 1, and then reacting these material components.

For instance, amino resin (A) of the present invention can be obtained by adding amino compound (a) to the solution obtained by adding aldehyde compound (b) in monohydric alcohol (c), and by reacting them under the presence of acid catalyst, and the temperature is in a range of approximately 40 to 120° C. for 20 to 180 minutes, and thereby condensation reaction and etherification reaction are carried out simultaneously.

Otherwise, amino resin (A) of the present invention can also be obtained by adding an amino compound, such as melamine, benzoguanamine and the like, beside amino compound (a) which comprises at least one carboxyl group in a phenyl group of benzoguanamine, and is represented by chemical formula 1, to the solution obtained by adding aldehyde compound (b) in monohydric alcohol (c), and adding amino compound (a) which comprises at least one carboxyl group in a phenyl group of benzoguanamine, and is represented by chemical formula 1 during condensation and etherification reactions.

It is preferable that amino resin (A) used in the present invention is checked for viscosity, molecular weight, tolerance against alcohols or hydrocarbons, and the like during the reaction, and then the reaction be terminated when the desired specified values thereof are obtained.

Amino resin (A) prepared by the above reactions can be used as it is. However, in order to remove residual non-reacted lower alcohols, organic solvents used in synthesizing amino resin (A), and the like, crude amino resin (A) is distilled or azeotropically distilled with water by a well-known and conventional means such as distillation. Then, a solution comprising stable amino resin (A) is obtained by adding water soluble organic solvent, and can be used.

Examples of water soluble organic solvents include
ketones such as dimethyl ketone, methyl ethyl ketone, diacetone alcohol, and the like;
ether alcohols and ethers such as ethylene glycol monomethyl ether, ethylene glycol dimethyl ether, ethylene glycol monoethyl ether, ethylene glycol diethyl ether, ethylene glycol mono(iso)propyl ether, ethylene glycol mono(iso)butyl ether, ethylene glycol mono-tert-butyl ether, ethylene glycol monohexyl ether, 1,3-buthylene glycol -3-monomethyl ether, 3-methyl-3-methoxybutanol, diethylene glycol monomethyl ether, diethylene glycol dimethyl ether, diethylene glycol monoethyl ether, diethylene glycol diethyl ether, diethylene glycol monobutyl ether, triethylene glycol dimethyl ether, propylene glycol monomethyl ether, propylene glycol dimethyl ether, dipropylene glycol monomethyl ether, dipropylene glycol dimethyl ether and the like;

esters and ether esters such as ethylene glycol monomethyl ether acetate, ethylene glycol monoethyl ether acetate, 1-methoxy-2-propyl acetate, and the like; and alcohols such as methyl alcohol, ethyl alcohol, (iso)propyl alcohol, sec-butanol, tert-butanol, furfury alcohol, and the like, which are described above. Needless to say, these may be used alone, or in combinations of two or more.

Certainly, the presence of excessive lower alcohols which do not participated in etherification among monohydric alcohol compounds (c) described above, is effective in making the resin hydrophilic. Moreover, amino resin (A) can be more effectively hydrophilic by using the aforementioned water soluble organic solvent together at the same time.

In addition, it is possible to use amino resin (A) as an aqueous solution or an aqueous dispersion which are obtained by mixing amino resin (A), water, aforementioned water soluble solvents, and slightly soluble solvents.

Examples of solvents which are slightly soluble in water and water insoluble solvents, include ketones such as methyl isobutyl ketone, 2,6-dimethyl-4-heptanone, 2-octanone, methyl amyl ketone, cyclohexanone, 3,5,5-trimethyl-2-cyclohexene-1-one, and the like;

alcohols such as normal butyl alcohol (n-butyl alcohol), isobutanol, 1-pentanol, isoamyl alcohol, 2-ethylhexanol, 4-methyl-2-propanol, benzyl alcohol, furfuryl alcohol, and the like;

esters, ethers, and ether esters such as methyl acetate, ethyl acetate, n-propyl acetate, isopropyl acetate, n-butyl acetate, isobutyl acetate, isoamyl acetate, ethylene glycol monobutyl ether acetate, methyl-1,3-butylene glycol acetate, diethylene glycol monobutyl ether acetate, 3-methyl-3-methoxybutyl acetate, ethyl 3-ethoxypropyonate, propylene glycol monomethyl ether acetate, propylene glycol monobutyl ether, propylene glycol mono(iso)propyl ether, dipropylene glycol monobutyl ether, tripropylene glycol monobutyl ether, propylene glycol phenyl ether, and the like; and hydrocarbons such as toluene, xylene, cyclohexane, n-hexane, octane, mineral spirit, petroleum mixture solvent, and the like.

Then, the target water-borne amino resin can be prepared by adding water in place of water soluble organic solvent, to amino resin (A), and making it hydrophilic. In making it hydrophilic, it is preferable to neutralize the carboxyl groups of amino resin (A) with alkali. However, the neutralization treatment may be omitted depending on the manner in which amino resin (A) is to be used.

Amino resin (A) can be hydrophilic by neutralizing the carboxyl groups thereof with alkali in well-known and conventional manners. Concretely hydrophilic treatment comprises the steps of dropping water droplets in the solution comprising amino resin (A) during stirring, and thereby phase inversion emulsification of them. Moreover, amino resin (A) can be hydrophilic by slowly dropping the obtained amino resin in sufficiently stirred water. In general, it is preferable that amino resin (A) is phase inversion emulsified by slowly dropping water droplets into the obtained amino resin solution while stirring at high speed, and the temperature thereof is maintained at approximately 60° C. or less.

In hydrophilic treatment, it is also preferable to stir by using a well-known and conventional homomixer, homogenizer, and the like which give mechanical shearing stress and to disperse and dissolve it using ultrasonic waves. In addition, in order to obtain a stable water solution comprising amino resin (A), it is preferable to use a water soluble organic solvent water while the above machines or ultrasonic wave is employed.

As water-borne resin (B) having a functional group reactive with the amino resin (A), any water-borne resin having a functional group reactive with the amino resin (A) may be used. Specifically, a water-borne resin having a functional hydrogen group reactive with the amino resin (A) can be used without particular limitations. Representative examples of the functional hydrogen group, include hydroxyl group, carboxyl group, N-alkoxyalkyl substituted amide group, N-alkoxyalkyl group, N-methylol group, and the like. In addition, water-borne resin (B) having an activated functional group comprises the aforementioned functional group, and an acid group such as carboxyl group, sulfonic acid group, and the like, or basic group such as an amino group, and the like, which are helpful for making the composition hydrophilic.

As water-borne resin (B) having an activated functional group, any resin which has the aforementioned functional groups, and acidic group or basic group which are helpful for making the composition hydrophilic, can be used without particular limitations. Representative examples of water-borne resin (B), include acrylic resin, polyester resin, alkyd resin, epoxy resin, urethane resin, and the like. Among these resins, water-borne resin neutralized with well-known and conventional volatile basic compounds, and the like, is preferably used.

Examples of the resin comprising hydroxyl groups and carboxyl groups, include polyester resin, acrylic resin, epoxy resin, and the like, which are obtained by the following typical manufacturing methods (a) to (c).

(a) polyester resin obtained by condensing the following alcohol component and acid component, and if necessary, by using monobasic acid such as benzoic acid, tert-butyl benzoic acid, and the like as acid component at the same time.

alcohol component; dihydroxyl alcohols such as ethylene glycol, propylene glycol, 1,3-butylene glycol, 1,6-hexanediol, dipropylene glycol, neopentyl glycol, triethylene glycol; polyhydric alcohols such as trimethylol ethane, trimethylol propane, trishydroxymethyl amino methane, pentaerythrit, dipentaerythritol, diglycerin, and the like, acid component; polycarboxylic acids and acid anhydrides thereof such as (anhydrous) phthalic acid, isophthalic acid, terephthalic acid, (anhydrous) succinic acid, adipic acid, azelaic acid, sebacic acid, tetrahydro (anhydrous) phthalic acid, hexahydro (anhydrous) phthalic acid, (anhydrous) Himic acid ((anhydrous) 3,6-endomethylene-1,2,3,6-tetrahydro-phthalic acid) (anhydrous) maleic acid, fumaric acid, itaconic acid, (anhydrous) trimellitic acid, methylene dichrohexene tricarboxylic acid (anhydride thereof), (anhydrous) pyromellitic acid, and the like.

In addition, alkyd resin obtained by reacting three components, that is, by adding fat and oil components which are mixture of at least one compound selected from the group consisting of oil components such as castor oil, dehydrated castor oil, tung oil, safflower oil, soybean oil, linseed oil, tall oil, coconut oil, and fatty acids thereof, and the like, to the abovementioned acid components, and alcohol components, and by reacting them. Moreover, modified polyester resin obtained by graft polymerization of vinyl monomers, above all acrylic monomers and polyester resin having unsaturated double bonds.

(b) vinyl copolymer, above all, acrylic resin having a number average molecular weight in a range of approximately 5,000 or more, more preferably in a range of approximately 5,000 to 30,000, which is obtained by using vinyl monomer having hydroxyl group such as, β-hydroxymethyl (meth) acrylate, β-hydroxyethyl (meth) acrylate, β-hydroxypropyl (meth) acrylate, β-hydroxyamyl (meth) acrylate, β-hydroxyhexyl (meth) acrylate, and vinyl monomer having carboxyl group such as (meth) acrylic acid, maleic acid, fumaric acid, as main components, in addition, by using vinyl monomer can copolymerize these monomers such as alkyl (meth) acrylates such as ethyl (meth) acrylate, butyl (meth) acrylate, 2-ethylhexyl acrylate [2-ethylhexyl (meth) acrylate], cyclohexyl acrylate [cyclohexyl (meth) acrylate], methyl methacrylate, and the like, vinyl monomers having N-alkoxyalkyl substituted amide such as N-(methoxymethyl) acrylamide, N-(isobuthoxymethyl) acrylamide, N-(buthoxymethyl) acrylamide, and the like, and aromatic vinyl monomers such as styrene, vinyltoluene, a -methylstyrene, and the like, and by copolymerizing them.

(c) epoxy resin having a number average molecular weight in a range of approximately 5,00 or more, more preferably in a range of approximately 500 to 5,000, which is obtained by addition reaction of polycarboxylic acids such as (anhydrous) phthalic acid, isophthalic acid, terephthalic acid, azelaic acid, tetrahydro (anhydrous) phthalic acid, (anhydrous) trimellitic acid, (anhydrous) pyromellitic acid, and the like, to diglycidyl ether type epoxy resins such as bisphenol A diglycidyl ether, bisphenol A di-β-methyl-diglycidyl ether, tetrahydroxyphenyl methanetetraglycidyl ether, novolak glycidyl ether, diglycidyl ether of addition product of alkyleneoxide to bisphenol A.

Representative examples of basic compounds used to be hydrophilic these resins having hydroxyl groups and carboxyl groups, there are no particular limitations, include inorganic bases such as sodium hydroxide, potassium hydroxide, and the like; alkylamines such as monomethylamine, dimethylamine, monoethylamine, diethylamine, triethylamine, and the like; hydroxylamines such as N-methylamino ethanol, N,N-dimethylethanolamino, N,N-diethylamino ethanol, 2-amino-2-methylpropanol, diethanolamine, triethanolamine, and the like; morpholine, ammonia, and the like. Certainly, these compounds may be used alone, or in combinations of two or more.

In particular, so-called volatile bases are preferable. Representative examples of the volatile bases include organic amines such as monoethanolamine, dimethylamine, diethylamine, triethylamine, triethanolamine, diethylethanolamine, N,N-dimethylethanolamine, morpholine, and the like. Amount of these bases may be used in which carboxylic groups of these resins containing hydroxyl groups are neutralized at least partly. Acid value of solid components contained in water-borne resin (B) having carboxyl groups is, in general, preferably in a range of approximately 10 to approximately 200. When the acid value is less than 10, the hydrophilicity thereof is inferior. When the acid value is more than 200, water resistance thereof is inferior.

Moreover, the reactive group of water-borne resin (B) is only hydroxyl group, it is preferable that the hydroxyl value of the solid components contained in water-borne resin (B) is in a range of 5 to 250. When the hydroxyl value is less than 5, the cross-linking density is low by any means, thereby, in particular hardeness, water resistance, and the like of the obtained cured film become easily inferior. When the hydroxyl value is more than 250, in particular, flexibility of the obtained cured film becomes easily inferior. Therefore, the hydroxyl value beside that range is not preferable. However, when a reactive group with amino resin (A) is comprised of water-borne resin (B), in addition to the hydroxyl group, the hydroxyl value thereof may be 0.

The water-borne resin compositions of the present invention preferably comprise 10 to 80 weight parts of amino resin (A) and 20 to 90 weight parts, more preferably 30 to 85 weight parts of water-borne resin (B). When amino resin (A) is less than 20 weight parts, in particular the flexibility and the like of the cured film comprised thereof become easily inferior. When water-borne resin (B) is more than 80 weight parts, hardeness and the like of the cured film comprised thereof become easily inferior. Therefore, these cases are not preferable.

Representative examples of water-borne acrylic resin among water-borne resin (B) used in the present invention include the resin containing hydrophilic group at side chain such as carboxyl group, carboxylate group, sulfonic acid group, sulfonate group, polyether group, and the like, more preferable so-called functional groups for cross-linking such as N-alkoxyalkyl substituted amide, and the like.

Specifically, these water-borne acrylic resin can be obtained by radical polymerization of monomer mixture comprising vinyl monomer containing carboxyl group, vinyl monomer containing functional group for cross-linking, other vinyl monomer which can polymerize these monomers, in organic solvent, copolymer having number average molecular weight in a range of approximately 1,000 to 30,000 is obtained, then, if necessary, by distilling under reduced pressure, thereby excess organic solvent is removed from the obtained copolymer solution, after that, by neutralizing carboxyl groups perfectly or partly, and by dissolve or dispersing in water or mixture comprising water and water soluble solvent.

Functional group for cross-linking in this specification means functional group reactable with in general so-called cross-linking agent such as amino-plast resins, pheno-plast resins, blocked isocyanate resins, polycarboxylic acid, and the like.

Representative examples of vinyl monomers containing carboxyl group used in preparing water-borne acrylic resin include acrylic acid, methacrylic acid, maleic acid, fumaric acid, and the like. In particular, acrylic acid, and methacrylic acid are preferable. 1 to 25 weight %, more preferably 2 to 20 weight % of these vinyl monomers having carboxyl group is used against total weight of monomers.

Representative examples of vinyl monomers containing N-alkoxyalkyl substituted amide bond among vinyl monomers containing functional group for cross-linking, include N-methoxymethyl (meth) acrylamide, N-ethoxymethyl (meth) acrylamide, N-isobuthoxymethyl (meth) acrylamide, N-n-buthoxymethyl (meth) acrylamide, and the like. Vinyl monomers containing N-alkoxyalkyl substituted amide bond are used at 2 to 60 weight %, more preferably 5 to 50 weight %.

Examples of other vinyl monomers containing functional groups for cross-linking include vinyl monomers containing hydroxyl group such as 2-hydroxyethyl (meth) acrylate, 2-hydroxypropyl (meth) acrylate, 4-hydroxybutyl (meth) acrylate, hydroxypentyl (meth) acrylate. hydroxyhexyl (meth) acrylate, and the like.

Representative examples of other vinyl monomers copolymerizable with both vinyl monomers containing carboxyl group and vinyl monomers containing functional group for cross-linking, include

- (meth) acrylates such as methyl (meth) acrylate, ethyl (meth) acrylate, n-butyl (meth) acrylate, isobutyl (meth) acrylate, tert-butyl (meth) acrylate, 2-ethylhexyl (meth) acrylate, lauryl (meth) acrylate, stearyl (meth) acrylate, methoxypolyethylene glycol (meth) acrylate, cyclohexyl (meth) acrylate, tetrahydrofurfuryl (meth) acrylate, isobornyl (meth) acrylate, 2-(meth) acryloyloxyethyl acid phosphate, benzyl (meth) acrylate, and the like;
- aromatic vinyl monomers such as styrene, vinyltoluene, α-methylstyrene, and the like;
- dialkyl esters of unsaturated dibasic acids such as dimethyl maleate, dibutyl maleate, dimethyl fumarate, dibutyl fumarate, dimethyl itaconate, dibutyl itaconate, and the like; and
- vinyl carboxylates such as vinyl acetate, vinyl propyonate, vinyl pivalate, vinyl versatate ($V_{eo}V_a$®), and the like.

In addition, representative examples of acrylic modified resin of water-borne resin (B) include acylic modified alkyd resin, acrylic modified epoxy resin, acrylic modified urethane resin, acrylic modified polyester resin, and the like. In order to prepare these acrylic modified resins, well-known and conventional preparing methods can be used.

Representative examples of preparing method of acrylic modified alkyd resin include (1) preparing method comprising the steps of radical polymerizing vinyl monomers in the presence of alkyd resin obtained form tetrahydro phthalic anhydride, thereby acrylgrafting them, (2) preparing method comprising the steps of addition reacting monomer containing glycidyl group and vinyl group such as glycidyl methacrylate to carboxyl group of alkyd resin previously synthesized, and by radical polymerizing aforementioned vinyl monomers under these conditions, and the like.

Moreover, representative examples of preparing methods of acrylic modified epoxy resin include (1) preparing method comprising the steps of radical polymerizing the above vinyl monomers under the presence of epoxy resin, thereby grafting acryl copolymer to epoxy resin, (2) preparing method comprising the steps of previously synthesizing acrylic resin having high acid value in the aforementioned manner, and then reacting epoxy group of epoxy resin and a part of carboxyl group of acrylic resin under the presence of tertiary amine, thereby graft polymer is obtained, in addition, by making remaining carboxyl group be hydrophilic, and the like.

When less than 5 weight parts of vinyl monomer containing functional group for cross-linking is used, cross-linking density thereof is lower by any means, then in particular hardness, and water resistance, above all, retort resistance of the obtained cured film is inferior. When more than 50 weight parts is used, in particular, flexibility of the obtained cured film is inferior. Therefore, these weight parts of vinyl monomer containing functional group for cross-linking are not preferable.

Moreover, the present invention relates to a water-borne resin composition characterized in that the water-borne resin (B) having a functional group reactive with amino resin (A) is water-borne resin having an activated hydrogen group, and the water-borne resin (B) is water dispersed resin obtained by emulsion polymerization. More specifically, the present invention relates to a water-borne resin composition characterized in that the water-borne resin (B) is water dispersed resin obtained by emulsion polymerization of unsaturated monomers containing unsaturated monomer having a functional group which can react with amino resin (A).

In addition, concretely, when the water-borne resin (B) of the present invention is water dispersed resin particularly obtained by emulsion polymerization, unsaturated monomer having a functional group which can react with amino resin (A) preferably comprise N-alkoxyalkyl substituted amide group, N-alkoxyalkyl group, N-methylol group, carboxyl group, or hydroxyl group.

There are no particular limitations placed on unsaturated monomer used in water-borne resin (B) obtained by emulsion polymerization of unsaturated monomers containing unsaturated monomer having a functional group which can react with amino resin (A).

Representative examples thereof include

- unsaturated monomers having hydroxyl group such as 2-hydroxyethyl acrylate, 2-hydroxyethyl methacrylate, 2-hydroxypropyl methacrylate, allyl alcohol, polyethylene glycol monoacrylate, glycerol monomethacrylate, and the like;
- unsaturated monomers having carboxyl group such as acrylic acid, methacrylic acid, maleic acid, fumaric acid, itaconic acid, crotonic acid, monoalkyl itaconate, maleic anhydride, itaconic anhydride, 2-methacryolylpropionic acid, 2-methacryoyloxyethylphthalic acid, and the like;
- unsaturated monomers having glycidyl group such as glycidyl acrylate, glycidyl methacrylate, allylglycidyl ether, and the like;
- unsaturated monomers having amide bond such as acrylamide, methacrylamide, N-alkylacrylamide, and the like;
- unsaturated monomers having N-alkylolamide bond such as N-methylolacrylamide, N-methylolmethacrylamide, and the like; and
- unsaturated monomers having N-alkoxyalkyl substituted amide bond such as N-methoxymethylacrylamide, N-buthoxymethylacrylamide, N-isobuthoxymethyl acrylamide, and the like. Certainly, these compounds may be used alone, or in combinations of two or more.

From the points of view of stability of water dispersed resin in emulsion polymerization, storage stability of desired water-borne resin composition, unsaturated monomers having hydroxyl group and/or unsaturated monomers having N-alkoxymethyl group are preferably used.

A ratio of unsaturated monomers having a functional group reactive with amino resin (A) in unsaturated monomers is preferably 3 to 70 weight parts, more preferably 5 to 50 weight parts against 100 weight parts of unsaturated monomers. When unsaturated monomers having a functional group reactive with amino resin (A) is used at less than 3 weight parts, cross-linking density easily becomes lower, and water resistance, hardeness, and the like of the cured material comprised of the obtained water-borne resin composition are easily inferior. When more than 70 weight parts is used, the stability of water dispersed resin in emulsion polymerization easily becomes inferior. Therefore, these cases are not preferable.

Moreover, a ratio of unsaturated monomers having carboxyl group in unsaturated monomers is preferably approximately 1 to 50 weight parts, more preferably 2 to 30 weight parts against 100 weight parts of unsaturated monomers. When unsaturated monomer having carboxyl group is used at less than approximately 1 weight part, the stability of water dispersed resin is inferior. When more than approximately 50 weight parts is used, in particular water resistance and the like of the cured material comprised of the water-borne resin composition are easily inferior. Therefore, these cases are not preferable.

In addition, there are no particular limitations placed on other unsaturated monomers which can copolymerize these monomers, and any well-known and conventional monomer may be used. Representative examples of the monomers include acrylates such as methyl acrylate, n-butyl acrylate, 2-ethylhexyl acrylate, and the like; methacrylates such as methyl methacrylate, ethyl methacrylate, n-butyl methcrylate, cyclohexyl methacrylate, and the like; maleic acid, fumaric acid, itaconic acid, and the like; vinyl esters such as vinyl acetate, vinyl propionate, vinyl tertiary carboxylate, and the like; aromatic vinyl compounds such as styrene, vinyltoluene, and the like; heterocyclic vinyl compounds such as vinylpyrrolidone and the like; vinylidene halides such as vinyl chloride, acrylonitrile, vinyl ether, vinyl ketone, vinylidene chloride, vinylidene fluoride, and the like; and α-olefins such as ethylene, propylene, and the like. Certainly, these compounds may be used alone, or in combinations of two or more.

Moreover, from the points of view of chemical stability of water dispersed resin to organic solvents and solvent resistance of water-borne resin composition, as unsaturated monomers which can copolymerize these monomers, it is also possible to use unsaturated monomers having a functional group giving cross-linking structures in water dispersed resin particles.

There are no particular limitations placed on the unsaturated monomers having a functional group giving cross-linking structures in water dispersed resin particles. Representative examples thereof include unsaturated monomers having hydrolytic silyl group such as vinyltrichlorosilane, vinyltrimethoxysilane, γ-methacyloxypropyltrimethoxysilane, γ-methacyloylpropyldiethoxymethylsilane, and the like;

unsaturated monomers having isocyanate group such as acryloylisocyanate, phenol additives of acryloylisocyanate ethyl, and the like; and monomers having unsaturated double bonds of 2 or greater such as divinylbenzene, allyl methacrylate, ethylene glycol dimethacrylate, trimethylolpropane triacrylate, triallyl cyanurate, and the like. These compounds may be used alone, or in combinations of two or more.

In order to control a molecular weight of the obtained copolymer in emulsion polymerization of unsaturated monomer components, it is possible to use chain transfer agents.

There are no particular limitations placed on the chain transfer agents.

Representative examples of the chain transfer agents include alkyl mercaptans such as n-octyl mercaptan, n-lauryl mercaptan, tert-hexadecyl mercaptan, and the like;

alkylbenzyl mercaptans such as benzyl mercaptan, dodecylbenzyl mercaptan, and the like;

thiocarboxylic acids such as thioglycollic acid, thiomalic acid, and the salts thereof and the like;

alkyl thiocarboxylates such as n-butyl thioglyconate, dodecyl-3-mercaptopropionate, and the like;

thiols containing nitrogen such as monoethanolamine thioglycolate, and the like;

mercaptans having reactive functional groups such as trimethoxysilylpropyl mercaptan and the like; and dimer type chain transfer agents such as α-methystyrene dimer, and the like. Moreover, in addition to these chain transfer agents, organic amines such as triethylamine, tributylamine, and the like; organic solvents such as carbon tetrachloride, acetaldehyde, and the like are used. Certainly, these compounds may be used alone, or in combinations of two or more.

Moreover, from the point of view of stability of polymerization, it is preferable to use surfactants, because emulsion polymerization is carried out in preparing the water dispersed resin (B).

There are no particular limitations placed on the surfactants, any usual surfactant used in emulsion polymerization can be used. Representative examples of the surfactants include anionic surfactants such as sodium alkylbenzenesulfonate, sodium alkylsulfate, sodium dialkylsulfosuccinate, sodium alkylphenylpolyoxyethylene sulfate, ammonium alkylphenylpolyoxyethylene sulfate, and the like;

nonionic surfactants such as polyoxyethylene alkyl ether, polyoxyethylene alkylphenyl ether, polyoxyethylene-polyoxypropylene block copolymer, and the like, and surfactants having unsaturated double bond therein, so-called reactive surfactants. and the like. There are no particular limitations placed on the amounts used of these surfactants. However, in general, the amounts used of surfactants in emulsion polymerization is suitable, that is, a range of approximately 0.2 to 10 weight parts against 100 parts of unsaturated monomer components is suitable.

Emulsion polymerization of unsaturated monomers is carried out by well-known and conventional methods. For example, the emulsion polymerization of unsaturated monomers can be carried out by using approximately 0.1 to 5 weight parts of initiator, approximately 50 to 1,000 weight parts of water, against 100 weight parts of unsaturated monomer component, and then polymerizing them at a temperature in a range of approximately 40 to 90° C.

Moreover, the emulsion polymerization is carried out by using both the above initiator, and approximately 0.1 to 5 weight parts of reductants together at the same time, a so-called redox polymerization. In this polymerization, it is also possible to use compounds producing so-called multi-charged metallic salt ions such as iron ion, copper ion, and the like as initiators together at the same time.

Examples of initiators which can be used the above reactions include persulfurates such as potassium persulfurate, sodium persulfurate, ammonium persulfurate, and the like; azo initiators such as azobisisobutyronitrile, the salts thereof, and the like; and peroxide initiators such as hydrogen peroxide, tert-butyl hydroperoxide, cumene hydroperoxide, and the like. Representative examples of the above reductants which can be used with these initiators at the same time include sodium sulfoxylate formaldehyde, sodium pyrosulfite, L-ascorbic acid, and the like.

From the point of view of practical use, concerning with solid content in emulsion polymerization, it is preferable that the solid content of water dispersed resin (B) used in preparing water-borne resin composition of the present invention is approximately 10 to 70 weight %. Moreover, the unsaturated monomers, the initiators, and the reductants are added in well-known and conventional manners such as a batchwise, continuous dropwise, divisional adding, and the like.

Namely, many emulsion polymerization methods such as emulsifier free emulsion polymerization, seeded emulsion polymerization, microemulsion polymerization, power-feed method, shot growth method, and the like can be applied in addition to a popular emulsion polymerization. Moreover, water dispersed resin (B) can be obtained by mixing 2 or more kinds of water dispersed resins respectively obtained by emulsion polymerization.

The water dispersed resin (B) prepared above methods can be used alone. However, when water dispersed resin (B) is obtained by using the above unsaturated monomers containing carboxyl group, from the point of view of compatibility with amino resin (A), and stability of the obtained water-borne resin composition, it is preferable to neutralize the obtained water dispersed resin (B) with a basic compound. There are no particular limitations placed on the usable basic compounds. Representative examples of the usable basic compounds include inorganic bases such as sodium hydroxide, potassium hydroxide, and the like; organic amines such as methylamine, isobutylamine, triethylamine, monoethanolamine. N,N-dimethylethanolamine, morpholine, and the like; and ammonia, and the like.

If necessary, so-called accelerators of curing may be used as so-called curing agents in the water-borne resin compositions of the present invention, such as sulfonic acid catalysts such as p-toluenesulfonic acid, dodecylbenzenesulfonic acid, dinonylnaphthalenedisulfonic acid, and the like; phosphoric acid catalysts such as phosphoric acid, methyl phosphorate, ethyl phosphorate, butyl phosphorate, and the like, amine salts thereof blocked by the aforementioned volatile bases (basic compounds). These catalyst may also be generally used in a range of approximately 0.1 to 1.0 weight parts to 100 parts of solid components of the resin.

Moreover, it is possible to arrange and roll any additives such as leveling reagents, anti-foaming reagents, lubricants, pigments dispersing reagents, anti-dropping reagents, anti-color separation reagents, matting reagents, UV absorption reagents, age resisters, and the like, in addition to well-known and conventional pigments for coatings or inks.

When these curing catalysts, pigments, and additives are used, it is possible to accept well-known and conventional mixing methods or rolling methods such as roll-mill, sand-mill, ball-mill, paint mixer, and the like.

The water-borne coating composition of the present invention can be coated in a well-known and conventional methods such as immersion coating, brush coating, spray coating, roll coating, and the like. Moreover, the water-borne coating composition of the present invention can be coated on the surfaces of many materials such as wood, paper, fiber, plastic, ceramics, inorganic cement, iron, non-iron metals, and the like, for example, then can produce excellent properties.

Water-borne resin compositions of the present invention are useful as a binder or an additive for coatings, processed paper goods, processed fiber goods, adhesives, inks, and other coatings.

Moreover, the water-borne coatings of the present invention can produce excellent cured film by baking in a range of approximately 80 to 300° C. for 5 seconds to 30 minutes. The water-borne coatings of the present invention can be used in many ways. However, in particular, the water-borne coatings can produce extreme properties for water-borne coatings used for metal materials or metal goods, above all, for metal cans, film laminate cans, and the like used for a drink or a food, and for PCM (precoated metal).

EXAMPLES

Next, an embodiment of the invention will be more specifically explained by giving manufacturing examples, comparative manufacturing examples, examples, and comparative examples. Unless specified otherwise, reference in these examples to parts and % refers to relative weights.

Manufacturing Example 1

[Example of the production of 2-(4,6-diamino-1,3,5-triazine-2-yl)-benzoic acid]

In this manufacturing example, an example of the production of 2-(4,6-diamino-1,3, 5-triazine-2-yl)-benzoic acid was disclosed as a representative example of an amino compound (a) having at least one carboxyl group in a phenyl group of benzoguanamine.

28 parts of potassium hydroxide was added to 1,300 parts of dimethyl sulfoxide placed in a reaction vessel made of glass, and fitted with a reflux condenser, a thermometer, and a stirrer, and was then dissolved at 50° C. 128 parts of o-dinitrilebenzene and 84 parts of dicyandiamide were added to the obtained solution. After the obtained mixture was heated at 85° C. for 3 hours, 225 parts of water was added. Then, the obtained 2-(4,6-diamino-1,3, 5-triazine-2-yl)-benzonitrileguanamine was suction filtered.

The obtained benzonitrileguanamine was washed with 1,200 parts of water and 1,200 parts of methanol, and dried at 100° C.

207 parts of 2-(4,6-diamino-1,3,5-triazine-2-yl)-benzonitrileguanamine obtained in this way was dissolved in 1,300 parts of dimethyl sulfoxide, and 2 parts of methylsulfonic acid was added thereto, then the obtained mixture was heated at 85° C. for 5 hours. After that, 225 parts of water was added to the mixture, and the obtained 2-(4,6-diamino-1,3,5-triazine-2-yl)-benzoic acid was suction filtered. Then filtrated material was washed with 1,200 parts of water and 1,200 parts of methanol, and cured at 100° C. in this way, 224 parts of 2-(4,6-diamino-1,3,5-triazine-2-yl)-benzoic acid having a melting temperature of 250° C. was obtained.

Manufacturing Example 2

[Example of production of amino resin (A-1)]

231 parts of 2-(4,6-diamino-1,3,5-triazine-2-yl)-benzoic acid obtained in the manufacturing example 1,240 parts of Koei formit NB [marketed by Koei Chemical Industrial Co., Ltd.; trade name of hemiformal solution, formation: formaldehyde/n-butanol/water=4/5/1 (weight parts)], and 210 parts of n-butanol were placed in a four-necked flask fitted with a decanter, a stirrer, and a thermometer, heated while stirring, and then reacted at 90° C. for 1 hour.

The reacted solution was dehydrated while refluxing, and was further reacted for 3 hours. Then the pH thereof was controlled to 8.0 with N,N-dimethylethanolamine. Non-reacted formaldehyde, n-butanol, and water were distilled off under reduced pressure (80 mm Hg) until the percentage of non-volatile components comprised of the obtained resin reached at 70%. After that, the reacted solution was diluted with 55.0 parts of ethylene glycol monobutyl ether.

In this way, the object resin solution having 60.5% of the components were non-volatile (measuring conditions=108° C./2hour) was obtained. Gardner viscosity thereof at 25° C. was W-X, and the color number measured in Gardner method (abbreviated as color number below) was 1 or less. Hereinafter, the obtained resin is abbreviated as amino resin (A-1).

Manufacturing Example 3
[Example of production of amino resin (A-2)]

231 parts of 2-(4,6-diamino-1,3,5-triazine-2-yl)-benzoic acid, 97.8 parts of 92% formaldehyde, and 320 parts of methanol were placed in a four-necked flask fitted with a reflux condenser, a stirrer, and a thermometer, heated while stirring, and then reacted at 70° C. for 3 hours.

Then the pH thereof was controlled to 8.0 with N,N-dimethylethanolamine. Non-reacted formaldehyde, methanol, and water were distilled off under reduced pressure (80 mm Hg) until the percentage of non-volatile components comprised of the obtained resin reached at 98%. After that, the reacted solution was diluted with 149.3 pans of ethylene glycol monobutyl ether.

In this way, the object resin solution having 60.3% of the components were non-volatile (measuring conditions=108° C./2hour) was obtained. The viscosity thereof was G-H, and the color number thereof was 1 or less. Hereinafter, the obtained resin is abbreviated as amino resin (A-2).

Manufacturing Example 4
[Example of production of amino resin (A-3)]

69.3 parts of 2-(4,6-diamino-1,3,5-triazine-2-yl)-benzoic acid, 88.2 parts of melamine, 352 parts of Koei formit NB, and 210 parts of n-butanol were placed in a four-necked flask fitted with a decanter, a stirrer, and a thermometer, heated while stirring, and then reacted at 90° C. for 1 hour.

The reacted solution was dehydrated while refluxing, and was further reacted for 3 hours. Then the pH thereof was controlled to 8.0 with N,N-dimethylethanolamine. Non-reacted formaldehyde, n-butanol, and water were distilled off under reduced pressure (80 mm Hg) until the percentage of non-volatile components comprised of the obtained resin reached at 70%. After that, the reacted solution was diluted with 40.0 parts of ethylene glycol monobutyl ether.

In this way, the object resin solution having 60.1% of the components were non-volatile (measuring conditions=108° C./2hour) was obtained. The viscosity thereof was S-T, and the color number thereof was 1 or less. Hereinafter, the obtained resin is abbreviated as amino resin (A-3).

Manufacturing Example 5
[Example of production of amino resin (A-4)]

80.8 parts of 2-(4,6-diamino-1,3,5-triazine-2-yl)-benzoic acid, 81.9 parts of melamine, 161.4 parts of 92% formaldehyde, and 320 parts of methanol were placed in a four-necked flask fitted with a reflux condenser, a stirrer, and a thermometer, heated while stirring, and then further reacted at 70° C. for 3 hours. Then the pH thereof was controlled to 8.0 with N,N-dimethylethanolamine. Non-reacted formaldehyde, methanol, and water were distilled off under reduced pressure (80 mm Hg) until the percentage of non-volatile components comprised of the obtained resin reached at 97%. After that, the reacted solution was diluted with 120.8 parts of ethylene glycol monobutyl ether.

In this way, the pale yellow object resin solution having 60.8% of the components were non-volatile (measuring conditions=108° C./2hour) was obtained. The viscosity thereof was J-K, and the color number thereof was 1 or less. Hereinafter, the obtained resin is abbreviated as amino resin (A-4).

Manufacturing Example 6
[Example of production of amino resin (A-5)]

69.3 parts of 2-(4,6-diamino-1,3,5-triazine-2-yl)-benzoic acid, 130.9 parts of benzoguanamine, 240 parts of Koei formit NB, and 210 parts of n-butanol were placed in a four-necked flask fitted with a decanter, a stirrer, and a thermometer, the temperature thereof was raised to 90° C. while stirring, and then further reacted at 90° C. for 1 hour. The reacted solution was dehydrated while refluxing, and was further reacted for 4 hours.

Then the pH thereof was controlled to 8.0 with N,N-dimethylethanolamine. Non-reacted formaldehyde, n-butanol, and water were distilled off under reduced pressure (80 mm Hg) until the percentage of non-volatile components comprised of the obtained resin reached at 70%.

After that, the reacted solution was diluted with 47.0 parts of ethylene glycol monobutyl ether. In this way, the object resin solution in which 60.3% of the components were non-volatile (measuring conditions=108° C./2hour) was comprised, the viscosity thereof was O-P, and the color number thereof was 1 or less. Hereinafter, the obtained resin is abbreviated as amino resin (A-5).

Manufacturing Example 7
[Example of production of amino resin (A-6)]

80.9 parts of 2-(4,6-diamino-1,3,5-triazine-2-yl)-benzoic acid, 121.6 parts of benzoguanamine, 97.8 parts of 92% formaldehyde, and 320 parts of methanol were placed in a four-necked flask fitted with a reflux condenser, a stirrer, and a thermometer. Then the pH thereof was controlled to 6.5 with N,N-dimethylethanolamine, heated while stirring, and etherified at 70° C. for 4 hours. After that, the pH thereof was controlled to 8.0 with N,N-dimethylethanolamine. Non-reacted formaldehyde, methanol, and water were distilled off under reduced pressure (80 mm Hg) until the percentage of non-volatile components comprised of the obtained resin reached at 98%. After that, the reacted solution was diluted with 120.1 parts of ethylene glycol monobutyl ether, and the precipitated salts were filtered. In this way, the object resin solution was obtained in which 60.3% of the components were non-volatile (measuring conditions=108° C./2hour) was comprised, viscosity thereof was G-H, and the color number thereof was 1 or less. Hereinafter, the obtained resin is abbreviated as amino resin (A-6).

Comparative Manufacturing Example 1
[Example of production of butylated melamine resin (X-1)]

126 parts of melamine, 374 parts of Koei formit NB, and 257 parts of n-butanol were placed in a four-necked flask fitted with a decanter, a stirrer, and a thermometer. Then the pH thereof was controlled to 6.0 with 50% phosphoric acid, the temperature thereof was raised to 90° C. while stirring, and then further reacted at 90° C. for 1 hour. The reacted solution was dehydrated while refluxing, and was further reacted for 6 hours. Non-reacted formaldehyde, n-butanol, and water were distilled off under reduced pressure (80 mm Hg) until the percentage of non-volatile components comprised of the obtained resin reached at 70%.

After that, the reacted solution was diluted with 44.5 parts of ethylene glycol monobutyl ether. In this way, the object resin solution was obtained in which 60.3% of the components were non-volatile (measuring conditions=108° C./2hour) was comprised, the viscosity thereof was R-S, and the color number thereof was 1 or less. Hereinafter, the obtained resin is abbreviated as butylated melamine resin (X-1).

Comparative Manufacturing Example 2
[Example of production of methylated melamine resin (X-2)]

126 parts of melamine, 195.6 parts of formaldehyde, and 384 parts of methanol were placed in a four-necked flask fitted with a reflux condenser, a stirrer, and a thermometer. Then the pH thereof was controlled to 10.0 with 5N-sodium hydroxide, the temperature thereof was raised to 70° C. while stirring, and then further methylolificated at 70° C. for 2 hours. The pH thereof was controlled to 3.0 with 50% sulfuric acid, and etherified at 70° C. for 4 hours. After that, the pH thereof was controlled to 7.0, methanol, formaldehyde, and water were distilled off under reduced pressure.

Then the reacted solution was diluted with 120.0 parts of ethylene glycol monobutyl ether, and the precipitated salts were filtered. In this way, methylated melamine resin was obtained in which 60.3% of the components were non-volatile was comprised, the viscosity thereof was H-I, and the color number thereof was 1 or less. Hereinafter, the obtained resin is abbreviated as methylated melamine resin (X-2).

Comparative Manufacturing Example 3
[Example of production of butylated benzoguanamine resin (X)-3)]

187 parts of benzoguanamine, 225 parts of Koei formit ND, and 184 parts of n-butanol were placed -in a four-necked flask fitted with a decanter, a stirrer, and a thermometer. Then the pH thereof was controlled to 6.0 with 50% phosphoric acid, the temperature thereof was raised to 90° C. while stirring, and then further reacted at 90° C. for 1 hour. The reacted solution was dehydrated while refluxing, and was further reacted for 6 hours. Non-reacted formaldehyde, n-butanol, and water were distilled off under reduced pressure (80 mm Hg) until the percentage of non-volatile components comprised of the obtained resin reached at 70%.

After that, the reacted solution was diluted with 44.5 parts of ethylene glycol monobutyl ether, and the precipitated salts were filtered. In this way, buthyletherificated benzoguanamine resin was obtained in which 60.3% of non-volatile was comprised, the viscosity thereof was M-N, and the color number thereof was 1 or less. Hereinafter, the obtained resin is abbreviated as butylated benzoguanamine resin (X-3).

Comparative Manufacturing Example 4
[Example of production of methylated benzoguanamine resin (X-4)]

320.0 parts of methanol, 187.5 parts of 80% paraformaldehyde, and 187.0 parts of benzoguanamine were placed in a reaction vessel fitted with a stirrer, a thermometer, a reflux condenser, and a nitrogen gas inlet. Then the pH thereof was controlled to 10.0 with 5N-sodium hydroxide, and methylolificated at 70° C. for 2 hours. The pH thereof was controlled to 3.0 with 50% sulfuric acid, and etherified at 70° C. for 4 hours. After that, the pH thereof was controlled to 7.0 with 5N-sodium hydroxide, methanol, formaldehyde, and water were distilled off under reduced pressure.

Then the reacted solution was diluted with 124.0 parts of ethylene glycol monobutyl ether, and the precipitated salts were filtered. In this way, methyletherificated benzoguanamine resin was obtained in which 60.3% of the components were non-volatile was comprised, the viscosity thereof was E-F, and the color number thereof was 1 or less. Hereinafter, the obtained resin is abbreviated as methylated guanamine resin (X4).

Manufacturing Example 8
[Example of production of water-borne acrylic resin (B-1)]

450 parts of ethylene glycol monoisopropyl ether was placed in a reaction vessel fitted with a stirrer, a thermometer, a reflux condenser, a nitrogen gas inlet, and a funnel, and the temperature thereof was raised to 120° C. While the temperature was maintained, the droplets of the mixture comprising 87.0 parts of ethyl acrylate, 87.0 parts of n-butyl acrylate, 75.0 parts of styrene, 30.0 parts of 2-hydroxyethyl methacrylate, 21.0 parts of acrylic acid, and 18.0 parts of benzoyl peroxide, were continuously dropped from the funnel for 4 hours.

1 hour after the dropping was terminated, 3.0 parts of di-tert-butyl peroxide was added, and further reacted for 2 hours. After 380.0 parts of solvent was distilled off from the obtained resin solution under reduced pressure, the resin solution was neutralized with 20.0 parts of N,N-dimethylethanolamine. In addition, the neutralized solution was diluted with 210.0 parts of water, and then aqueous solution of acrylic resin was obtained in which 50.6% of the components were non-volatile was comprised, the acid value thereof was 26.5. Hereinafter, the obtained resin is abbreviated as acrylic resin (B-1).

Manufacturing Example 9
[Example of production of water-borne polyester resin (B-2)]

92.2 parts of anhydrous trimellitic acid, 79.9 parts of anhydrous phthalic acid, 26.3 parts of adipic acid, and 187.2 parts of neopenthyl glycol were placed in a reaction vessel fitted with a stirrer, a thermometer, a reflux condenser, a nitrogen gas inlet, a rectifying condenser, and a decanter, and these compounds were melt by heating to 160° C. While the condensed water was removed from the reaction system, the temperature was raised to 190° C. for 2 hours, and reacted at 190° C. When the acid value thereof was 53.0, the reacted material was cooled to 160° C., then 73.5 parts of ethylene glycol monobutyl ether was obtained.

When the temperature thereof reduced to 70° C., the reacted material was neutralized with 28.5 parts of N,N-dimethylethanolamine, and was diluted with 238.0 parts of water. Polyester resin aqueous solution was obtained in which 50.3% of the components were non-volatile was comprised, the acid value thereof was 26.7. Hereinafter, the obtained resin is abbreviated as polyester resin (B-2).

Example 1
[Example of production of coating]

The clear coating containing 50% of the components were non-volatile was obtained by mixing 33.3 parts of amino resin (A-1), 60.0 parts of acrylic resin (B-1), 2.2 parts of ethylene glycol monobutyl ether, 4.5 parts of water, and 0.1 parts of p-toluene sulfonic acid.

In addition, 55.0 parts of dispersed paste previously obtained by rolling with three-rollers mill was comprised of 30.0 parts of acrylic resin (B-I) and 25 parts of TIPAQUE® CR-93 [ISHIHARA SANGYO KAISYA LTD., trade name of titanium oxide]. And then, 55.0 parts of dispersed paste, 16.7 parts of amino resin (A-1), 28.3 parts of ethylene glycol monobutyl ether, 0.1 parts of p-toluene sulfonic acid were mixed, thereby the coating containing titanium in which 50% of the components were non-volatile were obtained.

Examples 2 to 8
[Example of production of coatings]

The coatings were obtained in the same manner as example 1, except to change the mixing weight ratio of solid components of amino resin (A) and water-borne resin (B) as shown in Table 1. Moreover, the units of the numerical values in Table 1 are weight parts.

TABLE 1

| | Example | | | | | | | |
|---|---|---|---|---|---|---|---|---|
| | 1 | 2 | 3 | 4 | 5 | 6 | 7 | 8 |
| Acrylic resin (B-1) | 6 | | 6 | | 6 | 6 | 6 | 6 |
| Polyester resin (B-2) | | 6 | | 6 | | | | |
| Amino resin (A-1) | 4 | 4 | | | | | | |
| Amino resin (A-2) | | | 4 | 4 | | | | |
| Amino resin (A-3) | | | | | 4 | | | |
| Amino resin (A-4) | | | | | | 4 | | |
| Amino resin (A-5) | | | | | | | 4 | |
| Amino resin (A-6) | | | | | | | | 4 |

Comparative Examples 1 to 6
[comparative example of coatings]

The comparative coatings were obtained in the same manner as example 1, except to change the mixing weight ratio of solid components of amino resin (X) and water-borne resin (B) as shown in Table 2. Moreover, the units of the numerical values in Tables are weight parts.

Various properties of the cured films comprised of the coatings prepared in examples 1 to 8, and comparative examples 1 to 6 were put together in Tables 3 and 4. Moreover, the properties thereof were measured as follows.

(Testing and Evaluating method)

(1) Properties of cured film

The test panels were obtained by coating the obtained clear coatings on tin plates having 0.23 mm thickness so that the thickness of the cured film was 5 to 7 micrometers ($\mu$m) with a draw-down rod, and were heated and cured at 180° C. for 10 minutes. The following tests were carried out by using the test panels.

Moreover, the other test panels were obtained by coating the coatings containing titanium on tin plates having 0.23 mm thickness so that the thickness of the cured film was 10 to 15 $\mu$m with a draw-down rod, and were heated and cured at $_{200}$° C. for 1 minute. The glossiness of test panels were evaluated. Then, the clear coatings were coated to the test panels so that the thickness of the cured film was 5 to 7 micrometers ($\mu$m), and cured at 200° C. for 1 minute, thereby the test panels were obtained. Then, the following tests were carried out by using the test panels.

(2) Water resistance

The test panels were immersed into boiling water for 30 minutes, and the conditions of cured films were observed.

(3) Corrosion resistance

The results of the following tests (A) and (B) were evaluated together.

[Test (A)]

Test panels in which cross-cuts were formed to the depth of the tin panel were immersed into 5% solution of salt, and measured the period in which rust or blisters were generated at the cuts, and ate or peeled away to 3 mm from the cuts at one side, thereby the corrosion resistance of the coatings were evaluated.

[Test (B)]

Salt spray tests in accordance with JIS Z-2371 were carried out by using test panels in which cross-cuts were formed to the depth of the tin panel. Then the periods were measured, in which rust or blisters were generated from the cuts, and ate or peeled away to 3 mm from the cuts at one side, thereby the corrosion resistance of the coatings were evaluated.

(4) Retort resistance

Test panels were put into an autoclave in which the temperature was raised to 130° C. at high pressure steam, and were left for 30 minutes. The conditions of the cured films of the test panels were observed.

(5) Pencil hardness

In accordance with JIS K-5400, the following tests (C) and (D) were carried out. The obtained results were evaluated together.

[Test (C)]

The same steps were carried out as the test of corrosion resistance of the above (3). That is, pencil scratching values at room temperature were measured by using the test panels obtained by immersing them into 25° C., 5% solution of salt until the rust or blisters were generated at the cuts, and ate or peeled away to 3 mm from the cuts at one side, and the other test panels obtained by spraying 5% solution of salt thereto until rust or blisters were generated at the cuts, and ate or peeled away to 3 mm from the cuts at one side.

[Test (D)]

The same steps were carried out as the test of retort resistance of the above (4). That is, pencil scratching values at room temperature and in a hot water at 80° C. were measured by using the test panels obtained by putting into an autoclave in which the temperature was raised to 130° C. by steam at high pressure, and by leaving them for 30 minutes.

(6) Flexibility

In accordance with JIS K-5400, Du pont impact test (load=500 g, impact hammer=½ inch), and Ericksen cupping test (6.0 mm) were carried out based on the following test methods (E) and (F), and the obtained results were shown together.

[Test (E)]

The same steps were carried out as a test of corrosion resistance of the above (3). That is, the Du pont impact test and Ericksen cupping test were carried out by using the test panels obtained by immersing them in 5% solution of salt until rust or blisters were generated in the test panels, and ate or peeled away to 3 mm from the cuts at one side, and the test panels obtained by spraying 5% solution of salt thereto until rust or blisters were generated the test panels, and ate or peeled away to 3 mm from the cuts at one side. Then, the cracks generated at the surfaces of the cured films formed on the test panels were observed, thereby processabilities thereof were evaluated.

[Test (F)]

The same steps were carried out as the test of retort resistance of the above (4). That is, the Du pont impact test and Ericksen cupping test were carried out by using the test panels obtained by putting into an autoclave in which the temperature was raised to 130° C. by steam at high pressure, and by leaving them for 30 minutes. Then the cracks generated at the surfaces of the cured films formed on the test panels were observed, thereby processabilities thereof were evaluated.

(7) Transparency of cured film

The test panels coated clear coatings were observed, and the transparency of cured film was evaluated.

(8) Glossiness of cured film

The test panels coated coatings containing titanium were observed, and the glossiness of cured films was evaluated.

(9) Storage stability of coatings

The obtained coatings were in storage at 40° C. for 30 days. Then, the conditions, viscosities, and the like of the coatings were evaluated. Moreover, the evaluating standards were as follows.

1: excellent
2: good
3: nearer good
4: possible to use (limitation of practical use)
5: nearer bad
6: bad
7: extremely bad

TABLE 2

|  | Comparative example | | | | | |
|---|---|---|---|---|---|---|
|  | 1 | 2 | 3 | 4 | 5 | 6 |
| Acrylic resin (B-1) | 6 |  | 6 |  | 6 | 6 |
| Polyester resin (B-2) |  | 6 |  | 6 |  |  |
| Butylated melamine resin (X-1) | 4 | 4 |  |  |  |  |
| Methylated melamine resin (X-2) |  |  | 4 | 4 |  |  |
| Butylated benzoguanamine resin (X-3) |  |  |  |  | 4 |  |
| Methylated benzoguanamine resin (X-4) |  |  |  |  |  | 4 |

TABLE 3

|  | Example | | | | | | | |
|---|---|---|---|---|---|---|---|---|
|  | 1 | 2 | 3 | 4 | 5 | 6 | 7 | 8 |
| Water resistance | 1 | 1 | 2 | 2 | 1 | 2 | 1 | 2 |
| Corrosion resistance | 1 | 1 | 2 | 2 | 1 | 1 | 1 | 1 |
| Retort resistance | 1 | 1 | 2 | 2 | 1 | 2 | 1 | 2 |
| Pencil hardness | 1 | 1 | 1 | 1 | 1 | 1 | 1 | 1 |
| Flexibility | 1 | 1 | 1 | 1 | 1 | 1 | 1 | 1 |
| Transparency | 1 | 1 | 1 | 1 | 1 | 1 | 1 | 1 |
| Glossiness | 1 | 1 | 1 | 1 | 1 | 1 | 1 | 1 |
| Storage stability | 1 | 1 | 1 | 1 | 1 | 1 | 1 | 1 |

TABLE 4

|  | Comparative example | | | | | |
|---|---|---|---|---|---|---|
|  | 1 | 2 | 3 | 4 | 5 | 6 |
| Water resistance | 4 | 7 | 4 | 7 | 3 | 3 |
| Corrosion resistance | 3 | 6 | 4 | 7 | 3 | 5 |
| Retort resistance | 3 | 6 | 3 | 7 | 2 | 6 |
| Pencil hardness | 4 | 6 | 4 | 6 | 3 | 3 |
| Flexibility | 6 | 3 | 7 | 2 | 6 | 7 |
| Transparency | 7 | 7 | 3 | 4 | 7 | 3 |
| Glossiness | 6 | 5 | 2 | 3 | 6 | 4 |
| Storage stability | 3 | 3 | 3 | 3 | 3 | 3 |

Manufacturing Example 10
[Example of production of amino resin (A-7)]

231 parts of 2-(4,6-diamino-1,3,5-triazine-2-yl)-benzoic acid, 300 parts of formit NB, and 368 parts of n-butyl alcohol were placed in a four-necked flask fitted with a decanter, a stirrer, and a thermometer, heated while stirring, and then reacted at 90° C. for 1 hour.

The reacted solution was dehydrated while refluxing, and was further reacted for 3 hours. Then the pH thereof was controlled to 8.0 with N,N-dimethylethanolamine. Non-reacted formaldehyde, n-butyl alcohol, and water were distilled off under reduced pressure (80 mm Hg) until the percentage of non-volatile components comprised of the obtained resin reached at 70%. After that, the reacted solution was diluted with 55 parts of deionized water.

In this way, the pale yellow object resin solution having 60.2% of the components were non-volatile (measuring conditions=108° C./2 hours) was obtained. The viscosity thereof at 25° C. was Z., and the color number was 1 or less. Hereinafter, the obtained resin is abbreviated as amino resin (A-7).

Manufacturing Example 11
[Example of production of amino resin (A-8)]

231 parts of 2-(4,6-diamino-1,3,5-triazine-2-yl)-benzoic acid, 114 parts of 92% formaldehyde, and 480 parts of methyl alcohol were placed in a four-necked flask fitted with a reflux condenser, a stirrer, and a thermometer, heated while stirring, and then reacted at 70° C. for 3 hours.

Then the pH thereof was controlled to 8.0 with N,N-dimethylethanolamine. Non-reacted formaldehyde, methyl alcohol, and water were distilled off under reduced pressure (80 mm Hg) until the percentage of non-volatile components comprised of the obtained resin reached at 98%. After that, the reacted solution was diluted with 150 parts of deionized water and 80 parts of ethylene glycol monobutyl ether.

In this way, the pale yellow object resin solution having 60.0% of the components were non-volatile (measuring conditions=108° C./2 hours) was obtained. The Viscosity thereof was Y-Z, and the color number thereof was 1 or less. Hereinafter, the obtained resin is abbreviated as amino resin (A-8).

Manufacturing Example 12
[Example of production of amino resin (A-9)]

92.4 parts of 2-(4,6-diamino-1,3,5-triazine-2-yl)-benzoic acid, 75.6 parts of melamine, 300 parts of Koei formit NB, and 220 parts of n-butyl alcohol were placed in a four-necked flask fitted with a decanter, a stirrer, and a thermometer, heated while stirring, and then reacted at 90° C. for 1 hour. The reacted solution was dehydrated while refluxing, and was further reacted for 3 hours.

Then the pH thereof was controlled to 8.0 with N,N-dimethylethanolamine. Non-reacted formaldehyde, n-butyl alcohol, and water were distilled off under reduced pressure (80 mm Hg) until the percentage of non-volatile components comprised of the obtained resin reached at 70%. After that, the reacted solution was diluted with 40 parts of deionized water and 20 parts of ethylene glycol monobutyl ether.

In this way, the pale yellow object resin solution having 60.1% of the components were non-volatile (measuring conditions=108° C./2 hours) was obtained. The Viscosity thereof was W-X, and the color number thereof was 1 or less. Hereinafter, the obtained resin is abbreviated as amino resin (A-9).

Manufacturing Example 13
[Example of production of amino resin (A-10)]

46.2 parts of 2-(4,6-diamino-1,3,5-triazine-2-yl)-benzoic acid, 100.8 parts of melamine, 260.9 parts of 92% formaldehyde, and 256 parts of methyl alcohol were placed in a four-necked flask fitted with a reflux condenser, a stirrer, and a thermometer, heated while stirring, and then further reacted at 70° C. for 3 hours. Then the pH thereof was controlled to 8.0 with N,N-dimethylethanolamine. Non-reacted formaldehyde, methyl alcohol, and water were distilled off under reduced pressure (80 mm Hg) until the percentage of non-volatile components comprised of the obtained resin reached at 97%. After that, the reacted solution was diluted with 100 parts of deionized water and 60 parts of ethylene glycol monobutyl ether.

In this way, the pale yellow object resin solution having 60.3% of the components were non-volatile (measuring conditions=108° C./2 hours) was obtained. The Viscosity thereof was R, and the color number thereof was 1 or less. Hereinafter, the obtained resin is abbreviated as amino resin (A-10).

Manufacturing Example 14
[Example of production of amino resin (A-11)]

115.5 parts of 2-(4,6-diamino-1,3,5-triazine-2-yl)-benzoic acid, 93.5 parts of benzoguanamine, 375 parts of Koei formit IB [marketed by Koei Chemical Industrial Co., Ltd.; trade name of hemiformal solution, formation: formaldehyde/ isobutyl alcohol/water 4/5/1 (weight parts) and 256.5 parts of isobutyl alcohol were placed in a four-necked flask fitted with a decanter, a stirrer, and a thermometer, heated to 90° C. while stirring, and then reacted at 90° C. for 1 hour. The reacted solution was dehydrated while refluxing, and was further reacted for 4 hours.

Then the pH thereof was controlled to 8.0 with N,N-dimethylethanolamine. Non-reacted formaldehyde, isobutyl alcohol, and water were distilled off under reduced pressure (80 mm Hg) until the percentage of non-volatile components comprised of the obtained resin reached at 70%. After that, the reacted solution was diluted with 25 parts of deionized water and 25 parts of ethylene glycol monobutyl ether.

In this way, the pale yellow object resin solution having 60.6% of the components were non-volatile (measuring conditions=108° C./2 hours) was obtained. The Viscosity thereof was W, and the color number thereof was 1 or less. Hereinafter, the obtained resin is abbreviated as amino resin (A-11).

Manufacturing Example 15
[Example of production of amino resin (A-12)]

69.3 parts of 2-(4,6-diamino-1,3,5-triazine-2-yl)-benzoic acid, 130.9 parts of benzoguanamine, 228.3 parts of 92% formaldehyde, and 320 parts of methyl alcohol were placed in a four-necked flask fitted with a reflux condenser, a stirrer, and a thermometer. Then the pH thereof was controlled to 6.5 with N,N-dimethylethanolamine, heated while stirring, the reacting temperature was raised to 90° C. After the temperature was reached to 90° C. and maintained the temperature for 10 minutes, the reacted solution became uniform.

The etherification reaction was carried out at 70° C. for 4 hours. Then the pH thereof was controlled to 8.0 with N,N-dimethylethanolamine. Methyl alcohol, formaldehyde, and water were distilled off under reduced pressure (80 mm Hg) until the percentage of non-volatile components comprised of the obtained resin reached at 98%.

After that, the reacted solution was diluted with 90 parts of deionized water and 100 parts of ethylene glycol monobutyl ether. Then, the object resin solution in which 60.7% of the components were non-volatile (measuring conditions= 108° C./2 hours) was comprised, the Viscosity thereof was U-V, and the color number thereof was 1 or less. Hereinafter, the obtained resin is abbreviated as amino resin (A-12).

Comparative Manufacturing Example 5
[Example of production of n-butylated melamine resin (X-5)]

126 parts of melamine, 300 parts of Koei formit NB, and 294 parts of n-butyl alcohol were placed in a four-necked flask fitted with a decanter, a stirrer, and a thermometer. Then the pH thereof was controlled to 6.0 with 50% phosphoric acid, the temperature thereof was raised to 90° C. while stirring. After raising the temperature thereof to 90° C., and keeping the temperature for 10 minutes, the reacted solution became uniform. In addition, the reaction was continued at 90° C. for 1 hour, the reacted solution was dehydrated while refluxing, and was further reacted for 6 hours. Non-reacted formaldehyde, n-butyl alcohol, and water were distilled off under reduced pressure (80 mm Hg) until the percentage of non-volatile components comprised of the obtained resin reached at 70%.

After that, the reacted solution was diluted with 25 parts of ethylene glycol monobutyl ether. In this way, the object resin solution was obtained in which 64.4% of the components were non-volatile (measuring conditions=108° C./2 hours) was comprised, the Viscosity thereof was V, and the color number thereof was 1 or less. Hereinafter, the obtained resin is abbreviated as n-butylated melamine resin (X-5).

Comparative Manufacturing Example 6
[Example of production of methylated melamine resin (X-6)]

126 parts of melamine, 228.3 parts of 92% formaldehyde, and 256 parts of methyl alcohol were placed in a four-necked flask fitted with a reflux condenser, a stirrer, and a thermometer. Then the pH thereof was controlled to 10.0 with 5N-sodium hydroxide, the temperature thereof was raised to 70° C. while stirring, and then further methylolated at 70° C. for 2 hours. The pH thereof was controlled to 3.0 with 50% sulfuric acid, and etherified at 70° C. for 4 hours. Then the pH thereof was controlled to 7.0 with 5N-sodium hydroxide, and non-reacted formaldehyde, methyl alcohol, and water were distilled off under reduced pressure (80 mm Hg) until the percentage of non-volatile components comprised of the obtained resin reached at 98%.

Then the reacted solution was diluted with 50 parts of ethylene glycol monobutyl ether, the precipitated salts were filtered, and was further diluted with 70 parts of deionized water. Then, methylated melamine resin was obtained in which 60.1% of the components were non-volatile (measuring conditions=108° C./2 hours) was comprised, the Viscosity thereof was G-H, and the color number thereof was 1 or less. Hereinafter, the obtained resin is abbreviated as methylated melamine resin (X-6).

Comparative Manufacturing Example 7
[Example of production of isobutylated benzoguanamine resin (X-7)]

187 parts of benzoguanamine, 375 parts of Koei formit IB, and 256.5 parts of isobutyl alcohol were placed in a four-necked flask fitted with a decanter, a stirrer, and a thermometer. Then the pH thereof was controlled to 6.0 with 50% phosphoric acid, the temperature thereof was raised to 90° C. while stirring, and then further reacted at 90° C. for 1 hour. The reacted solution was dehydrated while refluxing, and was further reacted for 6 hours.

Non-reacted formaldehyde, isobutyl alcohol, and water were distilled off under reduced pressure (80 mm Hg) until the percentage of non-volatile components comprised of the obtained resin reached at 70%. Then the reacted solution was diluted with 31 parts of ethylene glycol monobutyl ether, the precipitated salts were filtered. Then, isobutyletherificated benzoguanamine resin was obtained in which 66.0% of the components were non-volatile (measuring conditions=108° C./2 hours) was comprised, the Viscosity thereof was W-X, and the color number thereof was 1 or less. Hereinafter, the obtained resin is abbreviated as isobutylated benzoguanamine resin (X-7).

Comparative Manufacturing Example 8
[Example of production of methylated benzoguanamine resin (X-8)]

320 parts of methyl alcohol, 262.5 parts of 80% paraformaldehyde, and 187 parts of benzoguanamine were placed in a reaction vessel fitted with a stirrer, a thermometer, a reflux condenser, and a nitrogen gas inlet. Then the pH thereof was controlled to 10.0 with 5N-sodium hydroxide, and the temperature was raised to 70° C., and then methylolated at 70° C. for 2 hours. Then the pH thereof was controlled to 3.0 with 50% sulfuric acid, and etherified at 70° C. for 4 hours.

After that, the pH thereof was controlled to 7.0 with 5N-sodium hydroxide, non-reacted formaldehyde, methyl alcohol, and water were distilled off under reduced pressure (80 mm Hg) until the percentage of non-volatile components comprised of the obtained resin reached at 98%. Then the reacted solution was diluted with 140 parts of ethylene glycol monobutyl ether, and the precipitated salts were filtered. Then, methyletherificated benzoguanamine resin was obtained in which 65.5% of the components were non-volatile (measuring conditions=108° C./2 hours) was comprised, the Viscosity thereof was X-Y, and the color number thereof was 1 or less. Hereinafter, the obtained resin is abbreviated as methylated benzoguanamine resin (X-8).

Manufacturing Example 16
[Example of production of water dispersed resin (B-3)]

Unsaturated monomer mixture comprising 156 parts of n-butyl acrylate (abbreviated as n-BA below), 135 parts of methyl methacrylate (abbreviated as MMA below), and 9 parts of acrylic acid (abbreviated as AA below) was prepared. Then, a pre-emulsion was obtained by emulsifying the obtained mixture with 75 parts of deionized water with 6 parts of HIGHTENOL N-08 [marketed by DAI-ICHI KOGYO SEIYAKU CO., LTD., trade name of anionic surfactant].

354 parts of deionized water were placed in a 1 liter-reaction vessel fitted with a reflux condenser, a thermometer, and a stirrer, stirred while nitrogen gas introduced, and the temperature was raised to 80° C. After raising the temperature, the pre-emulsion and the solution obtained by dissolving 1.5 parts of sodium persulfate in 30 parts of deionized water were respectively dropped for 3 hours to the reaction vessel. In dropping, the temperature of the reaction vessel was maintained at 80° C., and continuously stirred. After dropping, the solution was further reacted at 80° C. for 2 hours, then cooled, and the reacted resin was taken out from the reaction vessel.

In this way, the object water dispersed resin in which 40.2% of the components were non-volatile (measuring conditions=108° C./1.5 hours) was comprised, the viscosity thereof measured by B type viscometer (the same as below) was 15 milli·Pascal·second (mPa·s), the pH thereof was 2.2. Hereinafter, the obtained resin is abbreviated as water dispersed resin (B-3).

Manufacturing Examples 17 and 18
[Example of production of water dispersed resins (B-4) and (B-5)]

The water dispersed resins (B-4) and (B-5) were prepared in the same manner as manufacturing example 16, except to use the materials shown in the following Table 5. Moreover, the units of the numerical values in Table 5 are weight parts. In Table 5, N-08 is an abbreviation of [HIGHTENOL N-08], HS-10 is an abbreviation of [HIGHTENOL HS-10, trade name of anionic surfactant having unsaturated double bond marketed by DAI-ICHI KOGYO SEIYAKU CO., LTD.], in addition, MAA, 2-HEMA, and i-BMAM respectively are abbreviations of methacrylic acid, 2-hydroxyethyl methacrylate, and N-isobuthoxymethylacrylamide.

TABLE 5

| | Manufacturing example | | |
|---|---|---|---|
| | 16 (B-3) | 17 (B-4) | 18 (B-5) |
| N-08 | 6 | | |
| HS-10 | | 6 | 6 |
| n-BA | 156 | 126 | 150 |
| MMA | 135 | 75 | 90 |
| AA | 9 | 9 | |
| MAA | | | 30 |
| 2-HEMA | | 90 | |
| i-BMAM | | | 30 |
| Non-volatile components (%) | 40.2 | 40.0 | 40.3 |
| Viscosity (mPa·s) | 15 | 22 | 40 |
| pH | 2.2 | 2.2 | 1.7 |

Example 9

The water-borne resin composition comprising 40% of the non-volatile components (measuring conditions=108° C./2 hours) was prepared by mixing 49.8 parts of amino resin (A-7), 49.8 parts of water dispersed resin (B-3), 25.3 parts of deionized water, and 0.1 parts of paratoluene-sulfonic acid. Moreover, the ratio of the solid components comprised of (A-7) and (B-3) was 4:6.

Examples 10 to 16

The water-borne resin compositions were obtained in the same manner as example 9, except to change the weight ratio of the resin solid components comprised of amino resin (A) and water dispersed resin (B) as shown in Tables 6 and 7. Moreover, the concentrations of non-volatile components comprised of water-borne resin compositions were controlled by adding deionized water. In Tables 6 and 7, the units of the numerical values are weight parts.

TABLE 6

| | Example | | | |
|---|---|---|---|---|
| | 9 | 10 | 11 | 12 |
| Water dispersed resin (B-3) | 6 | | | 5 |
| Water dispersed resin (B-4) | | 7 | | |
| Water dispersed resin (B-5) | | | 8 | |
| Amino resin (A-7) | 4 | | | |
| Amino resin (A-8) | | 3 | | |
| Amino resin (A-9) | | | 2 | |
| Amino resin (A-10) | | | | 5 |

TABLE 7

| | Example | | | |
|---|---|---|---|---|
| | 13 | 14 | 15 | 16 |
| Water dispersed resin (B-4) | 8 | 6 | | |
| Water dispersed resin (B-5) | | | 6 | 7 |
| Amino resin (A-10) | 2 | | | |

TABLE 7-continued

|  | Example | | | |
|---|---|---|---|---|
|  | 13 | 14 | 15 | 16 |
| Amino resin (A-11) |  | 4 |  |  |
| Amino resin (A-12) |  |  | 4 | 3 |

Comparative Examples 7 to 14

The comparative water-borne resin compositions were obtained in the same manner as example 9, except to change the weight ratio of the resin solid components comprised of amino resin (X) and water dispersed resin (B) as shown in Tables 8 and 9. Moreover, the concentrations of non-volatile components comprised of water-borne resin compositions were controlled by adding deionized water. In Tables 8 and 9, the units of the numerical values are weight parts.

TABLE 8

|  | Comparative example | | | |
|---|---|---|---|---|
|  | 7 | 8 | 9 | 10 |
| Water dispersed resin (B-3) | 7 | 7 |  |  |
| Water dispersed resin (B-4) |  |  | 6 | 7 |
| n-Butylated melamine resin (X-5) | 3 |  |  |  |
| Methylated melamine resin (X-6) |  | 3 | 4 | 3 |

TABLE 9

|  | Comparative example | | | |
|---|---|---|---|---|
|  | 11 | 12 | 13 | 14 |
| Water dispersed resin (B-3) |  |  | 8 | 7 |
| Water dispersed resin (B-5) | 8 | 6 |  |  |
| Methylated melamine resin (X-6) | 2 |  |  |  |
| Isobutylated benzoguanamine resin (X-7) |  | 4 | 2 |  |
| Methylated benzoguanamine resin (X-8) |  |  |  | 3 |

By using the water-borne resin compositions obtained in examples 9 to 16, and comparative examples 7 to 14, various properties of the water-borne resin compositions and the cured films comprised thereof, were evaluated. The evaluating methods are as follows.

(1) Compatibility

Amino resin and water dispersed resin are mixed. Then in preparing the water-borne resin compositions, it is observed whether or not the compositions were uniformly mixed. In addition, the compositions in which the viscosity thereof was rapidly increased immediately after preparing, were not able to be used in the following tests.

(2) Storage stability

After the water-borne resin compositions were in storage at 40° C. for 30 days, the appearances, the transition of viscosities thereof, and the like, were observed, thereby the storage stability was evaluated.

(3) Properties of cured film

[Preparing test panels]

Test panels were obtained by coating the obtained water-borne resin compositions on tin plates having 0.23 mm thickness so that the thickness of the cured film was 5 to 7 micrometers ($\mu$m) with a draw-down rod, and cured them at 180° C. for 10 minutes. The following tests were carried out by using the obtained test panels.

(4) Water resistance

The test panels were immersed into boiling water for 30 minutes, and the conditions of cured films were observed.

(5) Solvent resistance

The conditions of the remaining cured films which did not dissolve after a rubbing test with acetone (load 1 kg*200 times) were observed.

(6) Retort resistance

Test panels were put into an autoclave in which the temperature was raised to 130° C. by steam at high pressure, and then were left for 30 minutes. The conditions of the cured films formed on the test panels were observed.

(7) Pencil hardness

In accordance with JIS K-5400, the following tests ① to ③ were carried out.

① Pencil scratching values at room temperature were measured by using the obtained test panels, and were evaluated.

② Pencil scratching values of the test panels after the aforementioned retort resistance test, that is, the test panels put into an autoclave in which the temperature was raised to 130° C. by steam at high pressure, and then were left for 30 minutes.

③ Pencil scratching values of test panels immersed into 80° C. hot water.

[Evaluating standards]

Moreover, evaluating standards were as follows.

1: excellent

2: good

3: nearer good

4: possible to use (limitation of practical use)

5: nearer bad

6 : bad

7: extremely bad

The results of these tests were together shown in Tables 10 and 11. Moreover, in Table 11, * means that it is impossible to evaluate because amino resins and water-borne resin compositions cannot be mixed.

TABLE 10

|  | Example | | | | | | | |
|---|---|---|---|---|---|---|---|---|
|  | 9 | 10 | 11 | 12 | 13 | 14 | 15 | 16 |
| Compatibility | 1 | 1 | 1 | 1 | 1 | 1 | 1 | 1 |
| Storage stability | 1 | 1 | 1 | 1 | 1 | 1 | 1 | 1 |
| Water resistance | 2 | 1 | 2 | 1 | 2 | 1 | 1 | 1 |
| Solvent resistance | 2 | 1 | 1 | 1 | 2 | 1 | 1 | 1 |
| Retort resistance | 2 | 1 | 2 | 3 | 2 | 1 | 1 | 1 |
| Pensile hardness | 2 | 1 | 2 | 1 | 2 | 1 | 1 | 1 |

TABLE 11

|  | Comparative example | | | | | | | |
| --- | --- | --- | --- | --- | --- | --- | --- | --- |
|  | 7 | 8 | 9 | 10 | 11 | 12 | 13 | 14 |
| Compatibility | 7 | 3 | 3 | 3 | 2 | 7 | 7 | 7 |
| Storage stability | * | 3 | 3 | 3 | 3 | * | * | * |
| Water resistance | * | 6 | 3 | 4 | 4 | * | * | * |
| Solvent resistance | * | 6 | 4 | 5 | 6 | * | * | * |
| Retort resistance | * | 6 | 6 | 6 | 6 | * | * | * |
| Pencil hardness | * | 6 | 6 | 5 | 4 | * | * | * |

Manufacturing Example 19
[Example of production of amino resin (A-13)]

320 parts of methanol, 130 parts of 92% formaldehyde, and 231 parts of 2-(4,6-diamino-1,3,5-triazine-2-yl)-benzoic acid were placed in a four-necked flask fitted with a stirrer, a thermometer, reflux condenser, and a nitrogen gas inlet, and the temperature was raised to 70° C. After the reaction was carried out at 70° C. for 3 hours, the pH thereof was controlled to 8.0 with N,N-dimethylethanolamine. Non-reacted formaldehyde, methanol, and water were distilled off under heated and reduced pressure. Finally, the reacted solution was diluted with 90 parts of ethylene glycol monobutyl ether. Then, the pale yellow object methyletherificated resin solution having 80.2% of the components were non-volatile (measuring conditions=108° C./2 hours) was obtained. The viscosity thereof was $Z_5$–$Z_6$, and the color number was 1. Hereinafter, the obtained resin is abbreviated as amino resin (A-13).

Manufacturing Example 20
[Example of production of amino resin (A-14)]

280 parts of isobutanol, 180 parts of Koei formit IB [marketed by Koei Chemical Industrial Co., Ltd.; trade name of hemiformal solution, formation: formaldehyde/isobutanol/water=4/5/1 (weight parts)], and 231 parts of 2-(4,6-diamino-1,3,5-triazine-2-yl)-benzoic acid were placed in a four-necked flask fitted with a stirrer, a thermometer, a decanter, and a nitrogen gas inlet, the temperature was raised for 1 hour, and refluxed. Water was removed while refluxing, and the mixture was reacted for 4 hours. Then, the pH thereof was controlled to 8.0 with N,N-dimethylethanolamine. Non-reacted formaldehyde, isobutanol, and water were distilled off under reduced pressure.

Finally, the reacted solution was diluted with 55 parts of ethylene glycol monobutyl ether. Then, the object isobutyletherificated resin solution having 75.1% of the components were non-volatile (measuring conditions=108° C./2 hours) was obtained. The viscosity thereof was $Z_8$ or more, and the color number thereof was 1 or less. Hereinafter, the obtained resin is abbreviated as amino resin (A-14).

Manufacturing Example 21
[Example of production of amino resin (A-15)]

46.2 parts of 2-(4,6-diamino-1,3,5-triazine-2-yl)-benzoic acid, 149.6 parts of benzoguanamine, 187.5 parts of 80% paraformaldehyde, and 320 parts of methanol were placed in a reaction vessel fitted with a stirrer, a thermometer, a reflux condenser, and a nitrogen gas inlet, heated while stirring, raised the temperature to 70° C., and further reacted for 3 hours. Then, the pH thereof was controlled to 8.0 with N,N-dimethylethanolamine. Non-reacted formaldehyde, methanol, and water were distilled off under reduced pressure [0.6 micro·Pascal ($\mu$Pa)] until the percentage of the non-volatile components comprised thereof reached at 97%.

Then, the reacted solution was diluted with 110.0 parts of ethylene glycol monobutyl ether.

Then, the object methyletherificated resin solution having 80.5% of the components were non-volatile (measuring conditionss=108° C./2 hours) was obtained. The viscosity thereof was $Z_5$–$Z_6$, and the color number thereof was 1 or less. Hereinafter, the obtained resin is abbreviated as amino resin (A-15).

Manufacturing Example 22
[Example of production of amino resin (A-16)]

258 parts of isobutanol, 225 parts of Koei formit IB, 92 parts of 2-(4,6-diamino-1,3, 5-triazine-2-yl)-benzoic acid, and 112 parts of benzoguanamine were placed in a reaction vessel fitted with a stirrer, a thermometer, a decanter, and a nitrogen gas inlet, heated while stirring, the temperature was raised to 90° C., and further reacted at the temperature for 1 hour. The reacted solution was dehydrated while refluxing, and was further reacted for 3 hours.

Then, the pH thereof was controlled to 8.0 with N,N-dimethylethanolamine. Non-reacted formaldehyde, isobutanol, and water were distilled off under reduced pressure (0.6,$\mu$Pa). Then, the reacted solution was diluted with 40 parts of ethylene glycol monobutyl ether.

In this way, the object isobutyletherificated resin solution having 74.8% of the components were non-volatile (measuring conditionss=108° C./2 hours) was obtained. The viscosity thereof was $Z_8$ or more, and the color number thereof was 1 or less. Hereinafter, the obtained resin is abbreviated as amino resin (A-16).

Manufacturing Example 23
[example of production of amino resin (A-17)]

69.3 parts of 2-(4,6-diamino-1,3,5-triazine-2-yl)-benzoic acid, 130.9 parts of benzoguanamine, 97.8 parts of 92% paraformaldehyde, 160 parts of methanol, 370 parts of n-butanol, and 0.2 parts of 10% sodium hydroxide were placed in a reaction vessel fitted with a stirrer, a thermometer, a reflux condenser, and a nitrogen gas inlet, the temperature was raised to 70° C., and further reacted at the temperature for 2 hours. Then, the pH thereof was controlled to 3.0 with 50% sulfuric acid, and reacted for 4 hours.

Moreover, the pH thereof was controlled to 8.0 with N,N-dimethylethanolamine, and formaldehyde, n-butanol, methanol, and water were distilled off under reduced pressure.

Then, the reacted solution was diluted with 47.0 parts of ethylene glycol monobutyl ether, and the precipitated salts were filtered. The object methyl and butyl mixed etherificated resin solution having 75.3% of non-volatile components was obtained. The viscosity thereof was $Z_7$–$Z_8$, and the color number thereof was 1 or less. Hereinafter, the obtained resin is abbreviated as amino resin (A-17).

Manufacturing Example 24
[example of production of amino resin (A-18)]

69.3 parts of 2-(4,6diamino-1,3,5-triazine-2-yl)-benzoic acid, 88.2 parts of melamine, 300.0 parts of Formit NB [marketed by Dainippon Ink & Chemicals Inc.; trade name of hemiformal solution, formation: formaldehyde/n-butanol/water=4/5/1 (weight parts)],
and 146 parts of n-butanol were placed in a reaction vessel fitted with a stirrer, a thermometer, a decanter, and a nitrogen gas inlet, the pH thereof was controlled to 6.5 with N,N-dimethylethanolamine, heated while stirring, the temperature was raised to 90° C., and further reacted at the temperature for 1 hour. Then, the reacted solution was dehydrated while refluxing, and reacted for 3 hours.

Moreover, the pH thereof was controlled to 8.0 with N,N-dimethylethanolamine, and n-butanol, formaldehyde, and water were distilled off under reduced pressure.

Then, the reacted solution was diluted with 47.0 parts of ethylene glycol monobutyl ether. The object butyletherificated resin solution was obtained in which 75.1% of the components were non-volatile was comprised, the viscosity thereof was $Z_4$–$Z_5$, and the color number thereof was 1 or less. Hereinafter, the obtained resin is abbreviated as amino resin (A-18).

Comparative Manufacturing Example 9
[example of production of comparative butylated melamine resin (X-9)]

126 parts of melamine, 375 parts of Koei Formit NB [marketed by Koei Chemical Industrial Co., Ltd.; trade name of hemiformal solution, formation: formaldehyde/n-butanol/water=4/5/1 (weight parts)], 257 parts of n-butanol and 0.5 parts of formic acid were placed in a reaction vessel fitted with a stirrer, a thermometer, a decanter, and a nitrogen gas inlet, heated while stirring, and refluxed. Moreover, water was removed while refluxing, and reacted for 4 hours. After that, n-butanol was distilled off under reduced pressure.

Finally, the reacted solution was diluted with 140.0 parts of ethylene glycol monobutyl ether. The object resin solution was obtained in which 74.7% of the components were non-volatile was comprised, the viscosity thereof was Y-Z, and the color number thereof was 1 or less. Hereinafter, the obtained resin is abbreviated as butylated melamine resin (X-9).

Comparative Manufacturing Example 10
[Example of production of comparative butylated benzoguanamine resin (X-10)]

187 parts of benzoguanamine, 225 parts of Formit NB, and 184 parts of n-butanol were placed in a four-necked flask fitted with a stirrer, a thermometer, a decanter, and a nitrogen gas inlet, the pH thereof was controlled to 6.0 with 50% phosphoric acid, the temperature thereof was raised to 90° C. while stirring, and further reacted at the temperature for 1 hour. The reacted solution was dehydrated while refluxing, and was further reacted for 6 hours. Non-reacted formaldehyde, n-butanol, and water were distilled off under reduced pressure (0.6 $\mu$Pa).

The reacted solution was diluted with 40.0 parts of ethylene glycol monobutyl ether. The object resin solution was obtained in which 75.1% of the components were non-volatile was comprised, the viscosity thereof was Z–$Z_1$, and the color number thereof was 1 or less. Hereinafter, the obtained resin is abbreviated as butylated benzoguanamine resin (X-10).

Comparative Manufacturing Example 11
[Example of production of comparative methylated benzoguanamine resin (X-11)]

320.0 parts of methanol, 187.5 parts of 80% paraformaldehyde, and 187.0 parts of benzoguanamine were placed in a reaction vessel fitted with a stirrer, a thermometer, a reflux condenser, and a nitrogen gas inlet, the pH thereof was controlled to 10.0 with 10% sodium hydroxide, and the temperature thereof was raised to 70° C.

The reacted solution was methylolated at 70° C. for 1 hour, then reduced to 30° C., the pH thereof was controlled to 3.0 with 36% hydrochloric acid, and etherified at 70° C. for 4 hours. After the pH thereof was controlled to 7.0 with 50% sodium hydroxide, methanol, formaldehyde, and water were distilled off.

Finally, the reacted solution was diluted with 124.0 parts of ethylene glycol monobutyl ether, and the precipitated salts were filtered. The object methyletherificated benzoguanamine resin was obtained in which 80.6% of the components were non-volatile were comprised, the viscosity thereof was $Z_2$–$Z_3$, and the color number thereof was 1 or less. Hereinafter, the obtained resin is abbreviated as methylated benzoguanamine resin (X-11).

Manufacturing Example 25
[Example of production of water-borne resin (B-6)]

450 parts of ethylene glycol monoisopropyl ether was placed in a reaction vessel fitted with a stirrer, a thermometer, a reflux condenser, a nitrogen gas inlet, and a funnel, and the temperature thereof was raised to 120° C. While the temperature was maintained, the droplets of the mixture comprising 24.0 parts of acrylic acid, 75.0 parts of isobutoxymethylacrylamide, 75.0 parts of styrene, 66.0 parts of ethyl acrylate. 60.0 parts of n-butyl acrylate, and 12.0 parts of azobisisobutyronitrile were continuously dropped from the funnel for 4 hours. 1 hour after the dropping was terminated, 3.0 parts of di-tert-butyl peroxide was added, and further reacted for 2 hours. After 380.0 parts of solvent was distilled off from the obtained resin solution under reduced pressure, the resin solution was neutralized with 30.0 parts of N,N-dimethylethanolamine.

Then, the neutralized solution was diluted with 210.0 parts of water, and then acrylic resin aqueous solution was obtained in which 50.7% of the components were non-volatile was comprised, 15% of organic solvent (include amine) was comprised, and the acid value thereof was 26.2 mgKOH/g. Hereinafter, the obtained resin is abbreviated as acrylic resin (B-6).

Manufacturing Example 26
[Example of production of water-borne resin (B-7)]

450 parts of n-butanol was placed in a reaction vessel fitted with a stirrer, a thermometer, a reflux condenser, a nitrogen gas inlet, and a funnel, and the temperature thereof was raised to 110° C. While the temperature was maintained, the droplets of the mixture comprising 105 parts of methacrylic acid, 105 parts of styrene, 90 parts of ethyl acrylate, and 6 parts of benzoyl peroxide were continuously dropped from the funnel for 4 hours. 1 hour after the dropping was terminated, 3 parts of benzoyl peroxide was added, and further reacted for 2 hours. The obtained acrylic resin solution comprised 39.8% of non-volatile components, and the acid value thereof was 90.9 mgKOH/g.

Continuously, 150 parts of the obtained acrylic resin, and 140 parts of Epicron 7050 [marketed by Dainippon Ink & Chemicals Inc.; trade name of epoxy resin] were placed in a reaction vessel fitted with a stirrer, a thermometer, a reflux condenser, a nitrogen gas inlet, and a funnel, and the temperature thereof was raised to 60° C. After that, 10 parts of N,N-dimethylethanolamine were added, the temperature thereof was raised, refluxed, and maintained the conditions for 2 hours.

Then, the mixture comprising 5 parts of N,N-dimethylethanolamine, 300 parts of water, and 15 parts of ethylene glycol monobutyl ether was dropped into the obtained resin for 20 minutes. The mixture was phase inversion emulsified, and stirred at 70° C. for 8 hours. Then, the acrylic modified epoxy resin solution was obtained by distilling off n-butanol with excess water under the heated and reduced pressure conditions, in which 38.2% of non-volatile components, 6% of organic solvent (include amine) was comprised, and the acid value thereof was 23.7 mgKOH/g. Hereinafter, the obtained resin is abbreviated as acryl modified epoxy resin (B-7).

Example 17

The clear coating containing 40% of non-volatile components, and 13% of organic solvent (include amine) was prepared by mixing 20.0 parts of amino resin (A-13) prepared in Manufacturing example 19, 47.3 parts of acrylic resin (B-6) obtained in Manufacturing example 25, 1.8 parts of ethylene glycol monobutyl ether, 30.7 parts of water, 0.2 parts of Nacure 3525 [marketed by King industries, trade name of amine salt of dodecylbenzenesulfonic acid].

In addition, 4.6 parts of dispersed paste previously obtained by rolling with three-rollers mill the mixture comprised of 35.5 parts of acrylic resin (B-6) and 30.0 parts of TIPAQUE® CR-93 [ISHIHARA SANGYO KAISYA LTD., trade name of titanium oxide], 15.0 parts of amino resin (A-13), 28.3 parts of ethylene glycol monobutyl ether, 0.2 parts of Nacure 3525 were mixed, thereby the white coating containing 60% of non-volatile components, and 13% of organic solvent, was obtained.

Examples 18 to 24

The coatings were prepared in the same manner as example 17, except to change the mixing weight ratio of solid components of amino resin (A) and water-borne resin (B), that is, acrylic resin (B-6) or acryl modified epoxy resin (B-7) as shown in Table 12. Moreover, the units of the numerical values in Table 12 are weight parts.

TABLE 12

|  | Example | | | | | | | |
| --- | --- | --- | --- | --- | --- | --- | --- | --- |
|  | 17 | 18 | 19 | 20 | 21 | 22 | 23 | 24 |
| Acrylic resin (B-6) | 6 | 7 | 5 | 7 | 7 |  | 6 | 7 |
| Acryl modified epoxy resin (B-7) |  |  |  |  |  | 5 |  |  |
| Amino resin (A-13) | 4 |  |  |  |  |  |  |  |
| Amino resin (A-14) |  | 3 | 5 |  |  |  |  |  |
| Amino resin (A-15) |  |  |  | 3 |  |  |  |  |
| Amino resin (A-16) |  |  |  |  | 3 | 5 |  |  |
| Amino resin (A-17) |  |  |  |  |  |  | 4 |  |
| Amino resin (A-18) |  |  |  |  |  |  |  | 3 |

Comparative Examples 15 to 18

The comparative coatings were prepared in the same manner as example 17, except to change the mixing weight ratio of solid components of amino resin (X) and acrylic resin (B-6) as shown in Table 13.

Comparative Examples 19

The comparative coating was obtained in the same manner as example 17, except to change the amounts of ethylene glycol monobutyl ether and water, thereby change the amount of organic solvent (include amine) contained thereof to 23%. Mixing ratios in comparative examples 15 to 19 were shown in Table 13. Moreover, the units of the numerical values in Tables are weight parts.

TABLE 13

|  | Comparative example | | | | |
| --- | --- | --- | --- | --- | --- |
|  | 15 | 16 | 17 | 18 | 19 |
| Acrylic resin (B-6) | 7 | 7 | 5 | 6 | 6 |
| Butylated melamine resin (X-7) | 3 |  |  |  |  |
| Butylated benzoguanamine resin (X-8) |  | 3 | 5 |  |  |
| Methylated benzoguanamine resin (X-9) |  |  |  | 4 | 4 |

The properties, conditions of the coatings obtained in examples 17 to 24, and comparative examples 15 to 19, and the properties, and conditions of the cured films were evaluated.

Moreover, the testing and evaluating method were as follows.

(1) Transparency of the coating solution

The transparency of clear coating solutions were observed.

(2) Storage stability of coatings

The obtained clear coatings and white coatings were in storage at 40° C. for 30 days. Then, the conditions and the transition of viscosities of the coatings were observed, and thereby the storage stability was evaluated.

(3) Amount of generating discharges (so-called fume; like tar)

The clear coatings were coated on tin plates having 0.23 mm thickness so that the thickness of the cured film was 8 to 10 micrometer ($\mu$m) with a draw-down rod, and heated and cured them at 180° C. for 10 minutes in an oven fitted a cooler at an exhaust opening. Then, discharge components deposited to the cooler were collected, and the amount of collected discharges were evaluated as the generated amounts of discharge.

(4) Appearance of cured film

The transparency of test panels obtained by coating the obtained clear coatings on tin plates having 0.23 mm thickness so that the thickness of the cured film was 5 to 7 micrometers with a draw-down rod, and heated and cured them at 180° C. for 10 minutes, were observed. The following tests were carried out by using the test panels.

Moreover, the white coatings were coated on tin plates having 0.23 mm thickness so that the thickness of the cured film was 10 to 15 $\mu$m with a draw-down rod, and heated and cured them at 200° C. for 1 minute. Then, the glossiness of the prepared test panels were evaluated. In addition, clear coatings were repeatedly coated to the test panels so that the thickness of the cured film was 5 to 7 micrometers ($\mu$m), and cured at 200° C. for 2 minutes, and thereby the test panels were obtained. Then, the following tests were carried out by using the test panels.

(5) Water resistance

The test panels were immersed into boiling water for 30 minutes, and the conditions of cured films were observed.

(6) Retort resistance

Test panels were put into an autoclave in which the temperature was raised to 130° C. by steam at high pressure, and were left for 30 minutes. The conditions of the cured films of the test panels were observed.

(7) Pencil hardness

In accordance with JIS K-5400, pencil hardness was evaluated as follows.

That is, the pencil scratching values at room temperature were measured, and thereby pencil hardness was evaluated.

Moreover, the pencil scratching values of the test panels at room temperature, the test panels were already used in the above test of retort resistance, that is, the test panels obtained by putting into an autoclave in which the temperature was raised to 130° C. by steam at high pressure, and by leaving them for 30 minutes. In addition, the pencil scratching values of the test panels put into 80° C. hot water were measured. Thereby pencil hardness was evaluated.

(8) Flexibility

In accordance with JIS K-5400, Du pont impact test (load=500 g, impact hammer=½ inch), and Ericksen cupping test (6.0 mm) were carried out.

The flexibility was evaluated by carrying out the aforementioned Du pont impact test and Ericksen cupping test, and observing the cracks formed on the surface of the cured film.

The flexibility was evaluated by carrying out the aforementioned Du pont impact test and Ericksen cupping test with test panels already used in the test of retort resistance, that is, the test panels obtained by putting into an autoclave in which the temperature was raised to 130° C. by steam at high pressure, and by leaving them for 30 minutes, and observing the cracks formed on the surface of the cured film.

Moreover, the evaluating standards used in Tables were as follows.

1: excellent
2: good
3: nearer good
4: possible to use (limitation of practical use)
5: nearer bad
6: bad
7: extremely bad These results are shown together in Tables 14 and 15.

TABLE 14

|  | Example | | | | | | | |
| --- | --- | --- | --- | --- | --- | --- | --- | --- |
|  | 17 | 18 | 19 | 20 | 21 | 22 | 23 | 24 |
| Transparency of coating solution (clear coating) | 1 | 1 | 1 | 2 | 1 | 1 | 1 | 2 |
| Storage stability of coatings | 1 | 1 | 1 | 2 | 1 | 1 | 1 | 2 |
| Amount of generating discharges | 2 | 1 | 2 | 1 | 1 | 2 | 1 | 3 |
| Appearance of cured film | 1 | 1 | 1 | 1 | 1 | 1 | 1 | 1 |
| Water resistance | 1 | 1 | 1 | 1 | 1 | 1 | 1 | 1 |
| Retort resistance | 3 | 2 | 1 | 1 | 1 | 1 | 2 | 2 |
| Pencil hardness | 2 | 2 | 1 | 2 | 2 | 1 | 1 | 2 |
| Flexibility | 2 | 1 | 1 | 1 | 1 | 1 | 2 | 2 |

TABLE 15

|  | Comparative example | | | | |
| --- | --- | --- | --- | --- | --- |
|  | 15 | 16 | 17 | 18 | 19 |
| Transparency of coating solution (clear coating) | 7 | 7 | 7 | 6 | 1 |
| Storage stability of coatings | 7 | 7 | 7 | 6 | 1 |
| Amount of generating discharges | 6 | 4 | 5 | 5 | 5 |
| Appearance of cured film | 2 | 2 | 2 | 2 | 2 |
| Water resistance | 2 | 2 | 2 | 2 | 2 |
| Retort resistance | 3 | 3 | 2 | 4 | 4 |
| Pencil hardness | 3 | 3 | 2 | 3 | 3 |
| Flexibility | 3 | 2 | 2 | 3 | 3 |

Industrial utilization possibility

The present invention can produce a water-borne resin composition comprising amino resin, which has excellent hydrophilicity, that is, water reducibility or water dispersibility, can decrease the amount of organic solvent contained in a coating, has excellent curability, water resistance, flexibility, heat resistance, hardness which are equivalent to those of hydrophobic amino resin, and which can decrease discharges in a dryer, and a water-borne coating comprised thereof.

What is claimed is:

1. Water-borne resin composition comprising:
   an amino resin (A) obtained from (i) an amino compound (a) comprising at least one carboxyl group in a phenyl group of benzoguanamine, the amino compound (a) being represented by the following chemical formula 1:

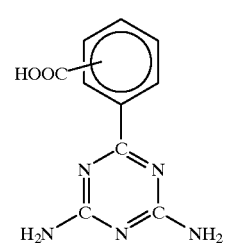

(1)

and (ii) at least one compound selected from the group consisting of urea, melamine, benzoguanamine, cyclohexanecarboguanamine, steroguanamine, acetoguanamine, phthaloguanamine, and spiroguanamine, and a water-borne resin (B) having a functional group reactive with the amino resin (A).

2. Water-borne resin composition according to claim 1, wherein amino resin (A) is obtained by addition reaction of aldehyde compound (b) to amino compound (a), at least one compound selected from the group consisting of urea, melamine, benzoguanamine, cyclohexanecarboguanamine, steroguanamine, acetoguanamine, phthaloguanamine, and spiroguanamine, and aldehyde compound (b), and etherificating with monohydric alcohol compound (c).

3. Water-borne resin composition according to any one of claims 1 and 2, wherein water-borne resin composition comprises 10 to 80 weight parts of amino resin (A) and 20 to 90 weight parts of water-borne resin (B).

4. Water-borne resin composition according to any one of claims 1 and 3, wherein water-borne resin (B) having a functional group reactive with the amino resin (A), comprises an activated hydrogen group.

5. Water-borne resin composition according to claim 4, wherein water-borne resin (B) comprises a hydroxyl group and a carboxyl group.

6. Water-borne resin composition according to claim 4, wherein water-borne resin (B) comprises N-alkoxyalkyl substituted amide group and carboxyl group.

7. Water-borne resin composition according to claim 4, wherein water-borne resin (B) is water dispersed resin obtained by emulsion polymerization.

8. Water-borne resin composition according to claim 4, wherein water-borne resin (B) is obtained by emulsion polymerization of unsaturated monomers comprising unsaturated monomer having a functional group which can react with amino resin (A).

9. Water-borne resin composition according to claim 8, wherein unsaturated monomer having a functional group which can react with amino resin (A) comprises at least one family selected from the group consisting of N-alkoxyalkyl substituted amide group, N-alkoxyalkyl group, N-methylol group, carboxyl group, and hydroxyl group.

10. Water-borne coating comprising a water-borne resin composition according to any one of claims 1 and 4 as an essential component.

11. Water-borne coating comprising a water-borne resin composition according to claim 3 as an essential component.

12. Water-borne coating comprising a water-borne resin composition according to claim 4, as an essential component.

13. Water-borne coating comprising a water-borne resin composition according to claim 5 as an essential component.

14. Water-borne coating comprising a water-borne resin composition according to claim 6 as an essential component.

15. Water-borne coating comprising a water-borne resin composition according to claim 7 as an essential component.

16. Water-borne coating comprising a water-borne resin composition according to claim 8 as an essential component.

17. Water-borne coating comprising a water-borne resin composition according to claim 9 as an essential component.

* * * * *

UNITED STATES PATENT AND TRADEMARK OFFICE
CERTIFICATE OF CORRECTION

PATENT NO.: 6,048,924
DATED : April 11 2000
INVENTOR(S): OBAYASHI et al

It is certified that an error appears in the above-identified patent and that said Letters Patent is hereby corrected as shown below:

On the title page of the patent insert into item [30] the Foreign Application Priority Data --August 11, 1997 [JP]   Japan   ....  PCT/JP97/02802--

Signed and Sealed this

Twenty-seventh Day of March, 2001

*Attest:*

NICHOLAS P. GODICI

*Attesting Officer*      *Acting Director of the United States Patent and Trademark Office*